(12) United States Patent
Amonette et al.

(10) Patent No.: US 8,423,375 B2
(45) Date of Patent: Apr. 16, 2013

(54) APPARATUS AND METHODS FOR PROCESSING MAIL USING A MANIFEST

(75) Inventors: Thomas M. Amonette, Greenfield, IN (US); John J. Sadler, Deinkirk, MD (US); John F. Gullo, Alexandria, VA (US)

(73) Assignee: United States Postal Service, Washington, DC (US)

( * ) Notice: Subject to any disclaimer, the term of this patent is extended or adjusted under 35 U.S.C. 154(b) by 1616 days.

(21) Appl. No.: 11/358,139

(22) Filed: Feb. 22, 2006

(65) Prior Publication Data

US 2006/0143141 A1 Jun. 29, 2006

Related U.S. Application Data

(62) Division of application No. 10/450,468, filed on Jun. 13, 2003.

(51) Int. Cl.
 *G06Q 10/00* (2012.01)
 *G06Q 30/00* (2012.01)
(52) U.S. Cl.
 USPC .......................................... 705/1.1; 705/14.1
(58) Field of Classification Search .......................... None
 See application file for complete search history.

(56) References Cited

U.S. PATENT DOCUMENTS

| | | | |
|---|---|---|---|
| 4,780,828 A * | 10/1988 | Whisker | 705/404 |
| 4,908,768 A | 3/1990 | Gelfer et al. | |
| 5,001,648 A | 3/1991 | Baker | |
| 5,079,714 A | 1/1992 | Manduley et al. | |
| 5,119,306 A * | 6/1992 | Metelits et al. | 705/406 |
| 5,245,545 A | 9/1993 | Taylor | |
| 5,459,670 A | 10/1995 | Johnson et al. | |
| 5,668,990 A | 9/1997 | Bajorinas et al. | |
| 5,768,132 A * | 6/1998 | Cordery et al. | 705/410 |
| 6,009,416 A * | 12/1999 | Pintsov | 705/410 |
| 2002/0026430 A1 | 2/2002 | Ryan, Jr. | |

OTHER PUBLICATIONS

Guide to Manifest Mailing (US Postal Service, Publication 401, Dec. 1997) (Guide).*
Guide to the Manifest Mailing System, Publication 401, U.S. Postal Service, Dec. 1997 (101 pages).
Manifest Analysis and Certification (MAC), 60 Fed. Reg. 47,765 (Sep. 14, 1995) (4 pages).
Manifest Analysis and Certification (MAC), 60 Fed. Reg. 58,692 (Nov. 28, 1995) (2 pages).

(Continued)

*Primary Examiner* — Matthew T Sittner
(74) *Attorney, Agent, or Firm* — Finnegan, Henderson, Farabow, Garrett & Dunner, LLP

(57) ABSTRACT

Methods and apparatus for manifesting mailpieces, processing mailpieces from a mail system, and certifying a mail system are provided. A mailpiece is received at a manifest mailing system and mailing information from the mailpiece is obtained. A manifest of the mailpiece is created and the mailpiece is then delivered using the manifest. Based on a certification of the mail system, an accuracy of a portion of the manifest may be selectively determined. Based on the accuracy of the portion of the manifest, the mailpieces are then conditionally delivered using the manifest. To determine a certification, test information may be provided to a mail system. A manifest generated by the mail system is then received. The accuracy of the manifest based on the test information is determine and a certification level is then assigned to the mail system.

7 Claims, 30 Drawing Sheets

OTHER PUBLICATIONS

Guide to the Manifest Mailing System, Revised Publication 401, 62 Fed. Reg. 36,585 (Jul. 8, 1997) (1 page).

Guide to the Manifest Mailing System, Revised Publication 401, 62 Fed. Reg. 55,841 (Oct. 28, 1997) (1 page).

Manifest Analysis Certification (MAC), Web Page at http://ribbs.usps.gov/mac.html (last visited May 5, 2005) (109 pages).

Tidwell, Michael, Notice of United States Postal Service of Filing of Library Reference SSR-148, Sep. 20, 1996.

Postal Service, Revised Publication 401, Guide to Manifest Mailing System, Federal Register: Jul. 8, 1997, vol. 62, No. 130.

Manifest Analysis Certification, Quality Mail Starts with Certified Software.

Manifest Analysis and Certification (www.usps.com/ncsc/products/mac.htm).

PCT International Search Report for PCT/US01/ 48237, filed Mar. 13, 2003.

NTEP, Approved Balances, Legal-for-Trade, as archived (Jan. 15, 2000), pp. 1-4.

USPS, "Package Shippers Guide to Manifesting" (11 pages).

USPS, "MAC Gold Technical Document" (12 pages).

USPS, "MAC Gold Manifest Mailing System Application Process" (3 pages).

USPS, "MAC Gold Technical Guide," Cycle A, Sep. 2000 (45 pages).

USPS, 39 C.F.R. Part 111, Manifest Analysis and Certification (MAC); Notice of Program (11 pages).

USPS, MAC Technical Guide (9 pages).

USPS, Federal Register Notice, Manifest Analysis and Certification (MAC) (8 pages).

\* cited by examiner

| Mailer's Name and Address 62 | | Post Office of Mailing 68 | | |
|---|---|---|---|---|
| | | Date of Manifest 72 | | |
| | | Class of Mail 74 | | |
| Permit Number 64 | MAC Ver. Number 66 | Sequence Number 70 | | Processing Category 76 →88 Page 1 40 |
| 94 | Piece ID Number →78 | Weight (lbs.) →80 | Zip/Zone (optional) →82 | Class/Rate →84 Postage →86 |
| | 1234 | .0625 | | 1 .33 |
| | 1333 | 2.0020 | | IP 4.30 |
| | 3456 | 10.4767 | 2 | BR 4.54 |
| 90↘ Page Total: | 3 | 12.5412 | Barcoded: 1 | 9.17 |
| 92↘ Cumulative Page Totals: 3 | | 12.5412 | Barcoded: 1 | 9.17 |

FIGURE 3

Manifest Analysis Certification GOLD Order Form  220

To avoid delays in processing, complete this form in its entirety (i.e., both pages).

222
- Attention Name_____
- Firm/Customer Name_____
- Address_____
- City_____ State_____ ZIP+4_____
- Technical Contact_____ Phone_____ Email Address_____
- Program Contact_____ Phone_____ Email Address_____

Fax_____ Web Address_____

Product Name_____ Version Number_____

Please note that these categories must be supported by your product

224

| Priority Mail | | Delivery Confirmation | | PS Form 3605-PR | |
|---|---|---|---|---|---|
| Parcel Post Intra BMC | | MAC Gold Manifest Report | | PS Form 3600-PM | |
| Parcel Post Inter BMC | | Standard Shipping Labels | | PS Form 3540-S | |

Options Supported

226

| Priority Mail Flat Rate | | Std Mail B Barcode Discount | |
|---|---|---|---|
| PS Form 3660-R | | Balloon Rate | |
| Job Set Up/Parameter Report | | Oversize Rate | |

228

Evaluation Fee: $500.00    TOTAL CHARGE ▶ _____

Tax ID# [ ][ ][ ][ ][ ][ ][ ][ ][ ][ ][ ][ ][ ][ ][ ][ ]

Purchase Order #: [ ][ ][ ][ ][ ][ ][ ][ ][ ][ ][ ][ ][ ]

☐ Check  ☐ Money Order  ☐ Visa  ☐ MasterCard
☐ Discover  ☐ American Express  ☐ Diners Club Card #: [ ][ ][ ][ ][ ][ ][ ][ ][ ][ ][ ][ ][ ][ ][ ][ ][ ][ ][ ][ ]

Card expiration Date ____/____

Authorized Personnel (please print)_____

Signature_____

The person signing above accepts total responsibility governing the use of this card and agrees to comply with the the terms of the issuer For further information, call
NATIONAL CUSTOMER SUPPORT CENTER
MAC GOLD CERTIFICATION DEPARTMENT
1-800-331-5746

Mail order form to:
ACCOUNTS RECEIVABLE
NATIONAL CUSTOMER SUPPORT CENTER
UNITED STATES POSTAL SERVICE
6060 PRIMACY PKWY STE 201
MEMPHIS TN 38188-0001

For USPS Use Only

Control Number:

Check Number:

1. List the suggested minimum requirements a computer must have to run your manifest product.

232 {
| CPU Size | | | | | | | |
|---|---|---|---|---|---|---|---|
| Hard Drive Capacity | | | | | | | |
| Memory | | | | | | | |
| Other | | | | | | | |
| | | | | | | | |
| | | | | | | | |
| | | | | | | | |
| | | | | | | | |

2. Circle all operating systems your manifest system is designed for. List any operating systems that are not listed.

234 {
| MS DOS | | |
|---|---|---|
| Windows NT | | |
| Windows 3.x | | |
| Windows 95 | | |
| Windows 98 | | |
| Windows 2000 | | |
| AS400/OS | | |
| UNIX | | |
| Other: | | |

3. List all weigh scales your manifest system support.

240 {
| Manufacturer | Model |
|---|---|
| | |
| | |
| | |
| | |
| | |
| | |

4. List all barcode formats your manifest system support.

236 {
| Barcode Format | |
|---|---|
| | |
| | |
| | |
| | |
| | |
| | |

5. List all thermal printers your manifest system support.

242 {
| Manufacturer & Model | |
|---|---|
| | |
| | |
| | |

238 {

After successful completion of testing, your certified product will be listed in the MAC Gold Certified Products List. Please provide the following information for inclusion in this list:

Sales Marketing Contact_____

Firm/Customer Name_____

Address_____

City_____ State_____ ZIP+4_____

Phone_____ Email Address_____ Web Address_____

FIGURE 10B

MAC Gold Standardized Manifest Format

Mailer's Name:
Address:

Date of Manifest:
Post Office of Mailing:
Permit Number:
Processing Category: MIXED
MAC Gold Product Name/Version Number:

Manifest Sequence Number:

Page 1

| Piece ID Number | Delivery Confirmation Number | 5-Digit ZIP Code | Weight (lbs.) | Class Rate | Fee | Postage | Cumulative Postage |
|---|---|---|---|---|---|---|---|
| 1296 | | | 1.20 | 1P | | 3.20 | 3.20 |
| 1357 | | | 2.02 | 1P | | 4.30 | 7.50 |
| 1358 | | | 10.38 | BI | | 4.09 | 11.59 |
| 1789 | | | 3.55 | 1P | | 5.40 | 16.99 |
| 1999* | ~276 | | 7.00 | BR | | 6.04 | 24.53 |
| 2345* | | | 15.25 | BR | | 10.74 | 34.53 |
| 2488* | | | 2.05 | BR | | 3.87 | 51.27 |
| 2499* | | | 8.56 | BI | | 3.47 | 55.14 |
| 2678 | | | 10.30 | 1PX | | 13.30 | 58.61 |
| 2789 | | | 38.09 | BN | | 13.32 | 71.91 |
| 4567 | | | 20.00 | 1P | | 17.00 | 85.23 |
| 4087 | | | 3.50 | 1P | | 5.40 | 126.46 |
| 5020 | 0202683733112345678901 | 37205 | 12.50 | BN | | 12.09 | 131.88 |
| 5088 | 0102683733112345678901 | 46201 | 1.20 | 1P | .25 | 3.20 | 144.23 |
| 5150 | 0102683733112345678902 | 46320 | 2.02 | 1P | | 4.30 | 147.42 |
| 5188* | 0102683733112345678903 | 40120 | 10.38 | BI | .25 | 4.09 | 151.72 |
| | 0102683733112345678904 | 01010 | 8.90 | 1P | | 8.60 | 155.66 |
| | 0202683733112345678900 | 04050 | 7.00 | BR | .25 | 6.04 | 173.01 |
| | 0202683733112345678901* | 60601 | 3.92 | BR | .25 | 5.32 | 179.30 |
| | 0202683733112345678802 | 60019 | 2.05 | BR | .25 | 3.87 | 164.87 |
| | 0202683733112345678803* | 70014 | 23.00 | BI | .25 | 5.05 | 188.99 |
| | 0202683733112345678804* | 35208 | 10.30 | 1PX | | 13.30 | 194.29 |
| | 0102683733112345678807 | 33401 | 12.88 | BN | .25 | 12.09 | 207.65 |
| | 0202683733112345678908 | | | | | | 219.93 |

FIGURE 11A

| Piece ID Number | Delivery Confirmation Number | 5-Digit ZIP Code | Weight (lbs.) | Class/ Rate | Fee | Postage | Cumulative Postage |
|---|---|---|---|---|---|---|---|
| 02026837331123456810* | 02026837331123456810 | 85021 | 2.78 | BI | .25 | 3.14 | 222.32 |
| 02026837331123456811* | 02026837331123456811 | 85280 | 10.47 | BR | .25 | 4.51 | 226.08 |
| 02026837331123456852* | 02026837331123456852 | 33528 | 2.03 | BR | .25 | 4.22 | 232.55 |
| 01026837331123456855 | 01026837331123456855 | 10019 | 7.37 | 1P | | 6.80 | 239.35 |
| 01026837331123456902 | 01026837331123456902 | 22002 | 3.50 | 1P | | 5.40 | 271.20 |
| 02026837331123456903 | 02026837331123456903 | 20260 | 50.25 | BN | .25 | 14.35 | 285.80 |
| 02026837331123456905* | 02026837331123456905 | 45021 | 2.78 | BI | .25 | 3.14 | 289.19 |
| 02026837331123456908* | 02026837331123456908 | 45221 | 10.47 | BR | .25 | 4.51 | 293.95 |
| 02026837331123456922* | 02026837331123456922 | 46350 | 10.25 | BR | .25 | 5.50 | 299.70 |
| 01026837331123456923 | 01026837331123456923 | 37680 | 7.37 | 1P | | 6.80 | 306.50 |
| 01026837331123456925 | 01026837331123456925 | 39020 | 3.05 | 1P | | 4.30 | 310.80 |
| 01026837331123456930 | 01026837331123456930 | 87010 | 8.50 | 1P | | 5.40 | 333.20 |
| 02026837331123456935 | 02026837331123456935 | 24050 | 12.30 | BN | .25 | 12.09 | 345.54 |
| Totals 49 | 30 | | 446.10 | | 4.00 | 341.54 | 345.54 |

PS Form 3877, Firm Mailing Book for Accountable Mail

Delivery Confirmation Pieces received _____

Signature of Receiving Employee _____ Round Stamp

PS Form 3152, Delivery Confirmation Certification

MAC Gold Certified Products Listing

MAC Gold 312     310
Certified Product - Cycle A

314:
- Company Name: Manifest R US    Software Developer for: *Retail*
- Product Name: FAST Manifest    Product Version: 1.2
- Sales Contact: John Doe
- Address: 123 South St
- City: Hartford    State: CT    ZIP+4: 06484-6140
- Phone: (800) 555-1212    Extension: 1235    Fax:
- Email: contact1@sample1.com    Web address: www.sample1.com 316:
Domestic Mail Classes     Special Service
- ▫ Priority Mail     ▫ Delivery Confirmation
- ▫ Priority Mail Flat Rate
- ▫ Parcel Post - Inter BMC
- ▫ Parcel Post - Inter BMC (machinable/nonmachinable)

318:
Options Supported

| | | |
|---|---|---|
| ▫ MAC Gold Manifest Report | ▫ Balloon Rate | Barcode Format: |
| ▫ Job Set Up/Parameter Report | ▫ PS Form 3540-S | USS 3 of 9, USS I 2 of 5, |
| ▫ Standard Shipping Label | ▫ PS Form 3800-PM | USS 128, UCC/EAN 128 |
| ▫ Standard Mail (B) Parcel Post Barcode Discount | | ▫ PS Form 3605-PR |
| ▫ Oversize Rate | | |

320:
Equipment Supported

- Platforms: PC: Windows 32 Bit (95/98/NT)
- Weigh Scales: Fairbanks, NCI, Toledo, Transtronic, Weigh-Tronix, Micro General, Sato, Eltron, Pennsylvania
- Thermal Printers: Zebra Stripe, Eltron, Sato, TEC, Intermec, Eaton, Datamax
- Inkjet Printers: Scitex, Videojet, All others
- Laser Printers: HP, Lexmark, All others
- Barcode Scanners: None given at this time 322:
- Price: $1000 - $5000     Date Certified: 5/15/00

FIGURE 15

UNITED STATES POSTAL SERVICE

MAC Gold Manifest Mailing System Application

| Mailer Name and Address (Street, City, State, ZIP+4) | Name of mailer representative responsible for your manifest system |
|---|---|
| | |

DUNS® Number (Note: DUNS® number required for use of Delivery Confirmation.)

| Signature and Date | Phone Number ( ) |
|---|---|
| e-Mail Address | FAX ( ) |

Check ONLY the options that are applicable to your system.

Priority Mail ☐      Parcel Post (single-piece rate) ☐
Delivery Confirmation ☐ (If checked, Form 1357 must be included.)

1. MAC Gold Product Information
   Product Name and Version Number: _____
   Scale Manufacturer and Model: _____
   Product Supplier/Installer: _____
         Address: _____
         Contact: _____
         Phone: _____

2. Will this system be installed at multiple mailing sites?    Yes ☐    No ☐
   If yes, please submit a separate application (with required documentation) for each mailing site.

3. Post office where permit imprint advance deposit account is authorized and permit number.
   (Note: Advance deposit account and permit imprint number required before submission of this application.)
   City/State/ZIP+4: _____    _____
                                                                                                   Permit Imprint #

4. If using Delivery Confirmation, select the method you will use to transmit the electronic files.
   ☐ Internet FTP
   ☐ FTP Dial-up (modem). Files will be sent:    ☐ Zipped    ☐ Unzipped 5. What days would you like to present your manifest mailings? [circle day(s)]
   M    Tu    W    Th    F    Sa 6. What date would you like to begin manifesting your mail? _____

Please submit: 1) This application; 2) the signed MMS agreement; and 3) Form 1357 (if using Delivery Confirmation) to the MAC Gold Department at the address to the right:

MAC Gold Department
National Customer Support Center
US Postal Service
6060 Primacy Pkwy STE 201
Memphis TN 38188-0001

You will be contacted by a USPS representative in your area to confirm the receipt of this application and to finalize your start-up date.

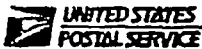

MAC GOLD MANIFEST MAILING SYSTEM AGREEMENT between the

UNITED STATES POSTAL SERVICE and

_____
(Mailer Name)

_____
(Street Address)

_____
(City/State         ZIP + 4)

1. This Manifest Mailing System (MMS) agreement contains the terms and conditions for implementing a MMS under the terms of the MAC Gold certified system procedures. The general requirements for the use of a MMS are described in Publication 401, *Guide to the Manifest Mailing System*, and the *Domestic Mail Manual* (DMM).

2. The mailer will prepare all mailings under the postal regulations in the DMM in addition to the requirements for using an MMS and this agreement.

3. The mailer will present mail under this agreement for verification by postal representatives at: _____
(Name of Administering Post Office)

4. This agreement is limited to mailings of Priority Mail and single-piece rate Parcel Post; Delivery Confirmation, at the mailer's option, may be used with Priority Mail and/or Parcel Post.

5. The mailer will perform the quality control procedures described below to ensure the accuracy of postage computations. The Postal Service reserves the right to require the mailer to implement other reasonable and appropriate quality control measures if the procedures described below do not appear adequate to ensure proper payment of postage.

- Ensure that scales used to establish the package weights are calibrated yearly by an accredited weights and measure firm. Proof of this procedure must be submitted to the administering post office.

FIGURE 17A

- Count all pieces submitted with the manifest and compare that count to the summary totals on the manifest. Ensure that the amounts agree with the data reported on the appropriate postage statement(s) before these documents are submitted to the Postal Service.

6. Postage will be paid at the office of mailing.

7. The mailer agrees to:

- Submit accurate computerized facsimile postage statements of the most current, official edition.

- Maintain sufficient funds on deposit to cover the postage charges for any mailings made.

- Promptly pay any and all moneys due the Postal Service for postage charges and Delivery Confirmation fees, if applicable.

8. The mailer will print a unique identification number on each mail piece. Numbers will not be duplicated in a mailing and will appear sequentially on the manifest.

9. The mailer will allow Postal Service employees to have reasonable access to mail preparation areas to observe mail production and verify mailing records.

10. The mailer will provide any assistance the Postal Service may require to conduct periodic monitoring and review of the MMS. Such review will include, but is not limited to, procedures for handling damaged and withdrawn pieces, for quality control and corrective actions, and production of accurate documentation.

11. When presenting mail to the Postal Service for verification, the mailer will provide all the following:

- A properly prepared postage statement.

- The manifest in hardcopy or electronic media.

- PS Forms 3877 and 3152. (These forms are generated automatically as part of the manifest when Delivery Confirmation is used.)

12. The mailer will retain the following documents for 90 days and make them available for inspection by the Postal Service within 48 hours:

- Manifest listings.

- Postage statement facsimiles.

FIGURE 17B

13. The mailer will provide written notice—at least 7 days in advance—to the Postal Service of any modification or adjustment to the computerized system used for the preparation of mailings under this agreement that might affect any of the following:

- The calculation of postage.

- Generation of required mailing documentation.

- Relocation or change in ownership.

14. The Postal Service will verify the accuracy of the postage calculations reflected on the computer-generated manifest according to the MAC Gold Acceptance Procedures described in Exhibit 47, Publication 401. If the Postal Service determines that postage is understated by more than 1.5%, additional postage will be charged. No adjustments will be made for overstatement of postage.

15. Manifest mailing system privileges may be suspended at any time by the Postal Service, pending review, when there is an indication that postal revenue is not fully protected.

16. The mailer may cancel this agreement at any time by giving written notice to the administering post office.

17. The District Manager may cancel this agreement—upon 15 days' written notice—if the manager determines:

- The mailer fails to provide manifests with correct data.

- The required quality control procedures are not being properly performed.

- The MMS does not comply with the requirements in the Domestic Mail Manual, Publication 401, or this agreement, and problems are not promptly resolved.

- Mailings are presented that are not properly prepared or properly paid for.

- The mailer has relocated or has changed ownership without notification.

- No manifested mailings are presented for more than 6 months unless approved by the RCSC.

18. This agreement will remain in effect for two years from the date the District Manager gives initial approval.

THIS AGREEMENT CONSISTS OF 18 ARTICLES AND CANNOT BE AMENDED OR CHANGED WITHOUT THE APPROVAL OF THE POSTAL SERVICE.

FIGURE 17C

Service Agreement

Mailer

Name: _____

City, State, ZIP+4: _____

Phone No.: _____

Signature and Date: _____

Postmaster

Name: _____

City, State, ZIP+4: _____

Phone No.: _____

Signature and Date: _____

District Manager

_____
(District Name)

Name: _____

City, State, ZIP+4: _____

Phone No.: _____

Signature and Date: _____

Manager, Rates & Classification Service Center  _____

Name: _____

City, State, ZIP+4: _____

Phone No.: _____

Signature and Date: _____

Signature by the above parties constitutes authorization for the mailer to enter mailings under the above service agreement.

FIGURE 17D

MAC Gold Confirmation Review Checklist

*Mailer Name:* _____

*Address:* _____

*Mailer's Requested Start Date:* _____

*Date of Review:* _____

*Name and Title of Reviewer:* _____

The MMS Quick Response Team is to confirm the mailer's MAC Gold system, preferably on mailer's desired start date, but if not possible, it must be done during first week of start date.

Ensure that the MAC Gold application package you received from the National Customer Support Center (NCSC) is available during the confirmation review. The application package should include the following:

1. MAC Gold Manifest Mailing System Application completed by the mailer.
2. MAC Gold Manifest Mailing System Agreement signed by the mailer.
3. MAC Gold Certificate and Product Listing.
4. Sample copies of approved formats for the manifest, postage statements, and shipping labels.

Note: These samples will be generic samples produced from the approved MAC Gold product that this mailer will be using, and may not reflect the mailer's particular information, such as name and address or particular rate category or combination of rate categories they may mail. For example, the sample manifest will show Priority Mail and Parcel Post with Delivery Confirmation, but the mailer may only be mailing Priority Mail. The samples are reference material. It is important that the mailer's live output matches the format, but not necessarily specific content.

Using the information above, and when the mailer has presented the completed mailing, manifest, and postage statements answer the following questions first:

Yes No
☐ ☐ 1. Does the MAC Gold product name and version as shown in the header of the manifest match the approved product as listed on the MAC Gold certificate?
☐ ☐ 2. Does the scale model connected to the mailer system match the approved product as listed on the MAC Gold Product Listing?
☐ ☐ 3. Is manifest formatted the same as the sample manifest received with the application?
☐ ☐ 4. Are the postage statements formatted the same as the sample postage statements received with the application?
☐ ☐ 5. Are the shipping labels on the pieces formatted the same as the sample shipping labels received with the application?

- If the answer is Yes to questions 1 through 5, then proceed with the postage sampling.

FIGURE 18A

- If No was checked for any of these questions, then stop your review. This indicates that either the system is not installed correctly, or that you have misinformation. To ensure that you have the correct information, call the NCSC at 1-800-238-3150 and ask for the MAC Gold Department. Explain the discrepancy to the MAC Gold specialist and determine if you have the most current information.
- If it is determined that No is the correct answer, then inform the mailer of the discrepancy. If the mailer cannot at that time correct the problem to your satisfaction, the mailer must contact their vendor and resolve the issue.
- If the discrepancy(ies) cannot be resolved during the day of your review, then inform the mailer that mailings cannot be submitted until the discrepancy(ies) have been corrected and the mailer informs you that he/she is ready for another review. You must review the mailer's operation again on the next requested date of mailing.

Note: If you cannot return on the date requested by the mailer, and if you have trained the local acceptance personnel in MMS acceptance procedures, the local acceptance personnel may complete the review of the documentation (questions 1 through 5) and conduct the postage sampling.

Postage Sampling

- Conduct a postage sampling using PS Form 8159, MMS Sampling/Postage Adjustment Worksheet Single-Piece Rate Mailings.
- Use the standard sampling size as required by Exhibit 39-Postage Sampling Plan for Itemized Manifests.
- Respond to the results as normally required (1.5% or less error, accept with no adjustment; more than 1.5% error, adjust postage if it was understated, and accept mailing, unless adjustment due to critical errors.). Record results on MMS Accuracy Worksheet.

Confirmation

If questions 1 through 5 are Yes, and if the postage sampling reveals none of these critical errors: a) missing pieces; b) duplicate numbers; or, c) obvious rate table errors, then the mailer's system is functioning as certified and the review is satisfactorily completed.

Note: You may confirm the system even if the postage sampling resulted in a postage adjustment, unless critical errors were noted. Do not approve if critical errors are found. Notify the NCSC MAC Gold Department of any such critical errors.

No follow-up review is required and the mailer is authorized to submit manifest mailings. Send the agreement, signed by the mailer, postmaster, and district manager, along with copies of the confirmation review form, the sampling form, the manifest, postage statement(s), and shipping labels to the RCSC Manager. The RCSC will perform a desk audit, and if all is in order, sign and send out the final agreement.

FIGURE 18B

APPARATUS AND METHODS FOR PROCESSING MAIL USING A MANIFEST

REFERENCE TO RELATED APPLICATIONS

This is a division of application Ser. No. 10/450,468, filed Jun. 13, 2003, which claimed the benefit under 35 U.S.C. §119(e) of provisional application Ser. No. 60/255,059, filed Dec. 14, 2000, both of which are incorporated herein by reference.

DESCRIPTION OF THE INVENTION

1. Field of the Invention

This invention relates generally to handling multiple items for delivery. More particularly, it relates to apparatus and methods for handling multiple delivery items using a manifest.

2. Background of the Invention

Companies and organizations (i.e., mailers) often deliver large amounts of items to a delivery service for delivery. Conventionally, each item is treated as an individual item. The items are typically deposited with a delivery system at a delivery service (e.g., the U.S. Postal Service), and the delivery system ensures that the items are delivered, with each item handled individually. At the delivery system, each item is then checked for delivery charges individually.

For example, FIG. 1A shows how a company may deliver items, such as mail using a mailing system. As shown in FIG. 1A, company 20 prepares 100 mailpieces 22 for delivery to a mailing system 32. Company 20 sends 100 mailpieces 22 in package 24 with each mailpiece having separate postage affixed, either by meter impression or by live stamps. Thus, each mailpiece in package 24 is treated as an individual mailpiece.

Because separate mailpiece handling requires individual processing, conventional mail handling by individual mailpiece is cumbersome for large mailings. Accordingly, some companies participate as mailers in bulk mailing programs.

In order for a mailer to participate in a bulk mailing program, such as, for example, the bulk mailing programs with the U.S. Postal Service, the mailer must typically mail identical weight mailpieces. Under these bulk mailing programs, the mailing service verifies each mailpiece by weighing it. Because mailpieces must be identical weights, this allows a bulk mailing program to efficiently handle large mailings in bulk.

However, mailers often use mailings with non-identical mailpieces. Since the mailpieces may have non-identical weights, metering or purchasing postage for each mailpiece individually is still required. Metering or purchasing postage for each mailpiece individually has proven unstable and inefficient.

It is accordingly desirable to allow a mailer to easily prepare and submit non-identical items to a delivery service for delivery. This is achieved by providing apparatus and methods, which can handle non-identical delivery items using a manifest.

SUMMARY OF THE INVENTION

In accordance with an aspect of the present invention, methods and apparatus for manifesting mailpieces are provided. A mailpiece is received at a manifest mailing system and mailing information from the mailpiece is obtained. Based on the mailing information, a manifest of the mailpiece is created. The mailpiece is then delivered using the manifest.

In accordance with another aspect of the present invention, methods and apparatus for processing mailpieces from a mail system are provided. A plurality of mailpieces and a manifest are received. The manifest includes mailing information for each of the plurality of mailpieces. Based on a certification of the mail system, an accuracy of a portion of the manifest is selectively determined. Based on the accuracy of the portion of the manifest, the plurality of mailpieces are then conditionally delivered using the manifest.

In accordance with yet another aspect of the present invention, methods and apparatus for certifying a mail system are provided. Test information is provided to a mail system. A manifest generated by the mail system is then received. An accuracy of the manifest based on the test information is determined and a certification level is then assigned to the mail system.

Additional features will be set forth in part in the description which follows, and in part will be obvious from the description, or may be learned consistent with methods and apparatus consistent with principles of present the invention. The features of the invention may be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

In the Figures:

FIG. 3 shows one embodiment of a manifest of FIG. 1B;

FIG. 10A shows one embodiment of a form used by a developer for MAC Gold certification;

FIG. 10B shows additional information of the sample form shown in FIG. 10A;

FIG. 11A shows a sample MAC Gold manifest;

FIG. 15 shows a sample MAC Gold certified product listing;

FIG. 16 shows one embodiment of a form used by a user in order to use a MAC Gold system;

FIGS. 17A-17D show one embodiment of a MAC Gold manifest mailing system agreement; and FIGS. 18A and 18B show one embodiment of a MAC Gold confirmation review checklist.

DESCRIPTION OF THE EMBODIMENTS

Figure 1A:
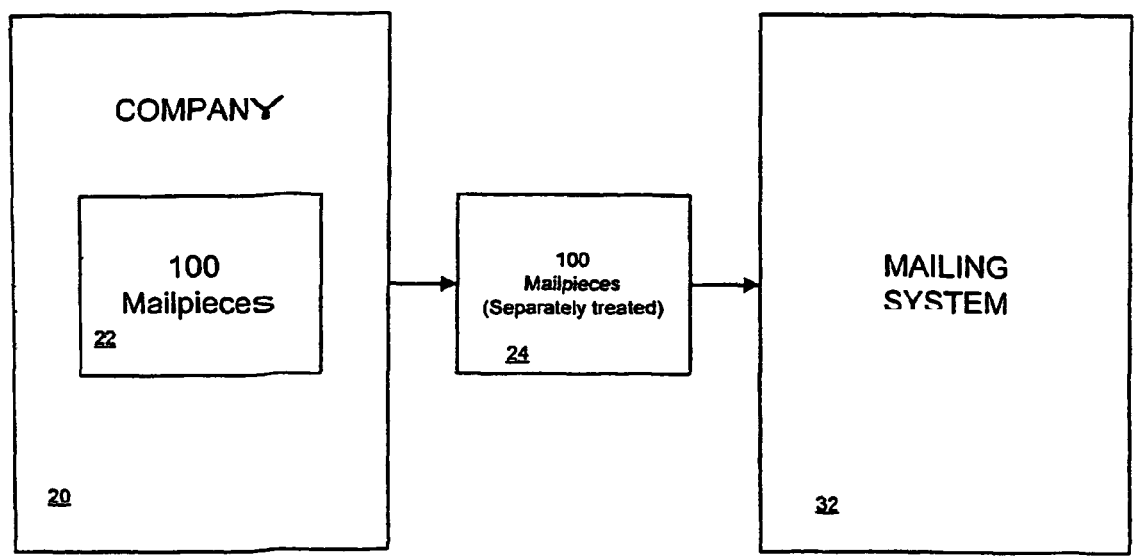
FIG. 1A shows how a company may supply delivery items to a delivery system at a delivery service.

Reference will now be made in detail to exemplary embodiments of the invention, examples of which are illustrated in the accompanying drawings. Wherever possible, the same reference numbers will be used throughout the drawings to refer to the same or like parts. Although the disclosed embodiments are described in relation to a mail service, the invention is not so limited and may be used with other types of delivery systems.

Manifest delivery systems have several advantages over conventional mailing systems. For example, manifest delivery systems may combine various classes of mail, including non-identical mailpieces. All classes of mail, except for periodicals and overnight mail (e.g., express mail), may be combined on the same manifest. For example, first class mail, standard A mail, and standard B mail may be listed on a single manifest, even though the mailpieces do not have identical weights. Thus, manifest delivery systems may combine various classes of mail to produce a large mailing of non-identical mailpieces and also may allow the mailing service to collect postage efficiently. Other advantages of manifest delivery systems may be apparent to those skilled in the art from consideration of the specification and practice of the invention disclosed herein.

There are various ways to prepare manifest delivery systems for delivery services. For example, in order for a mailer to utilize manifest mailing with the U.S. Postal Service (hereinafter Postal Service), the mailer must design a manifest mailing system that meets the standards of the Postal Service. The Postal Service standards are set forth in a publication, the *Guide to the Manifest Mailing System*, published by the U.S. Postal Service as publication number 401 (January 200), which is herein incorporated by reference in its entirety. However, any manifest delivery system with any mailer, which allows for manifest delivery using any set of standards is consistent with the principles of the present invention.

Under manifest mailing, each mailpiece is assigned a unique identification (ID) number. Each ID number is listed on a document known as a "manifest," which contains information about each mailpiece. In one embodiment, a manifest may include the weight, class, and how much postage was being paid. The manifest may also contain the total postage amount to be paid to the mailing service. For example, a guide to manifesting is described in a publication entitled, *Package Shippers Guide to Manifesting*, published by the U.S. Postal Service, which is herein incorporated by reference in its entirety. For simplicity, the following description describes manifest delivery with the Postal Service, but other delivery services may be used consistent with the principles of the present invention.

The Postal Service may require that the mailer enter into an agreement with the Postal Service that the mailer will comply with standards for paying postage. The Postal Service may also require that the mailer obtain approval for any manifest mailing system created by the mailer.

The approval process may involve the submission of an application to the Postal Service. Upon the submission of an application, the Postal Service conducts an approval procedure. For example, a local Post Office may send an inspector to inspect the mailer's manifest mailing system, by taking a sample mailpiece from a shipment using the mailer's manifest mailing system, checking the mailpiece against the manifest, and confirming that the manifest is compliant. If the Postal Service approves the mailer's manifest mailing system, then the system is approved.

Also, the Postal Service subsequently may make quality control assessment samples on a regular basis (e.g., weekly). For example, a mailer may either bring a shipment for quality control assessment to the local Post Office, or the local Post Office may send an inspector to the mailer's location.

If the mailer's manifest is within specified accuracy, e.g., 1½%, as checked by the Postal Service, then the Postal Service may accept the shipment. If the error rate exceeds the specified accuracy, then the Postal Service may adjust the mailer's postage and collect the proper rate of postage. These quality control assessments ensure that a mailer's manifest mailing system is accurate and reflects the proper postage.

In one embodiment, once a mailer has been approved and has submitted an accurate manifest, the Postal Service deducts the total amount of postage claimed on the manifest from an advance deposit account, which the mailer establishes with the Postal Service. However, other processes for approval and postage payment handling are within the principles of the present invention.

In order to speed the approval process, a Manifest Analysis and Certification (MAC) program is provided by the Postal Service. For example, under the MAC program, the Postal Service may test a mailer's software to make sure it is accurate and conforms to Postal Service standards. If the Postal Service approves the software, then the Postal Service may begin accepting shipments from a mailer's manifest mailing system, after only a hardware confirmation at each of the mailer's sites.

Additionally, there is a MAC Gold program (MAC Gold) provided by the Postal Service. MAC Gold may include pre-approval or certification by the Postal Service of both the software and the hardware used by a mailer for manifest mailing. For example, the Postal Service technical standards are described in *MAC Gold Technical Guide*, published by the U.S. Postal Service, which is herein incorporated by reference in its entirety. In one embodiment, all manifest mailing software may be required to use the same manifest format and specific type of shipping label. As a result, e.g., under MAC Gold, once a manifest mailing system has been developed by a supplier and approved, it may be considered ready for use. Thus, when a mailer buys a manifest mailing system from the supplier, the mailer may immediately begin using the system.

In one embodiment, certification or pre-approval may be tiered according to hardware and software, e.g., MAC and MAC Gold. However, the Postal Service provides for a wide variety of manifest mailing systems (MMS). For example, the various other MMS programs are also described in the U.S.

Postal Service publication, *Guide to the Manifest Mailing System*. Any combination or level of certification or pre-approval such as minimum buy and reduction provisions is within the principles of the present invention.

Figure 1B:
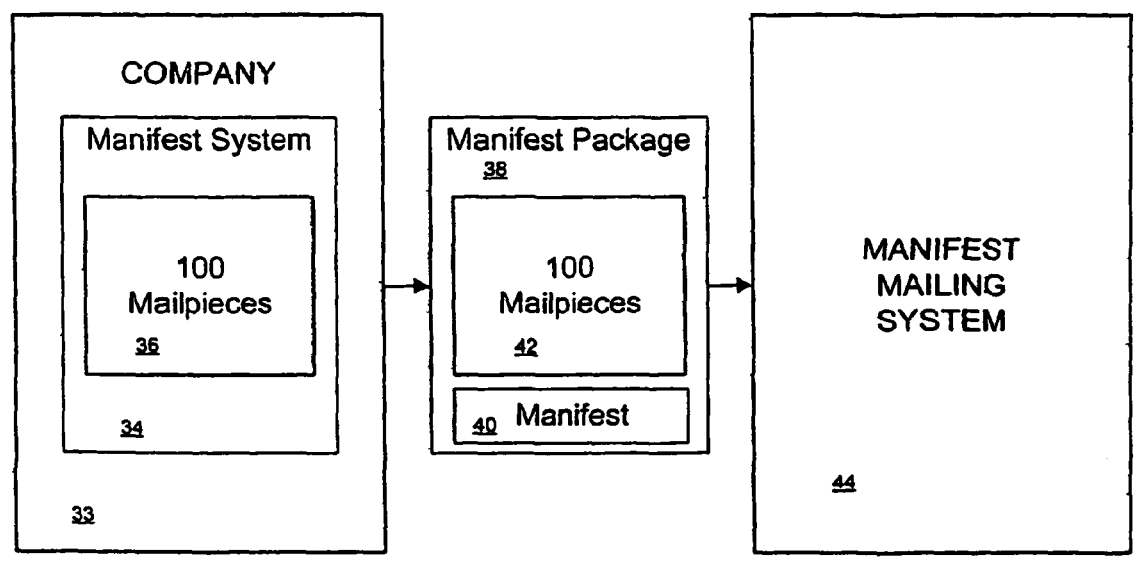
FIG. 1B shows one embodiment of mail being delivered using manifest mailing, consistent with the principles of the present invention.

FIG. 1B shows one embodiment of mail being delivered using manifest mailing, consistent with the principles of the present invention. In particular, company 33 prepares 100 mailpieces 36 and submits them to a manifest system 34. Company 33 sends a manifest package 38, which includes a manifest 40 and 100 mailpiece package 42. Manifest package 38 is then introduced into a manifest mailing system 44 to be verified, processed, and mailed, e.g., by the Postal Service.

For example, company 33 may affix a unique ID number (not shown) to each mailpiece included within 100 mailpiece package 42. Each ID number is then listed on manifest 40. Manifest 40 lists all 100 mailpieces, and includes information about each individual mailpiece.

In one embodiment, a manifest includes mail information such as weight, a zone rated mailpiece indication, a destination zone, a special service indication, the fee paid for special service (if any), postage paid for that special service, and a total amount of postage summarized showing the total amount of postage. However, any mailpiece information, which may aid in mail handling, is within the principles of the present invention.

Figure 2:
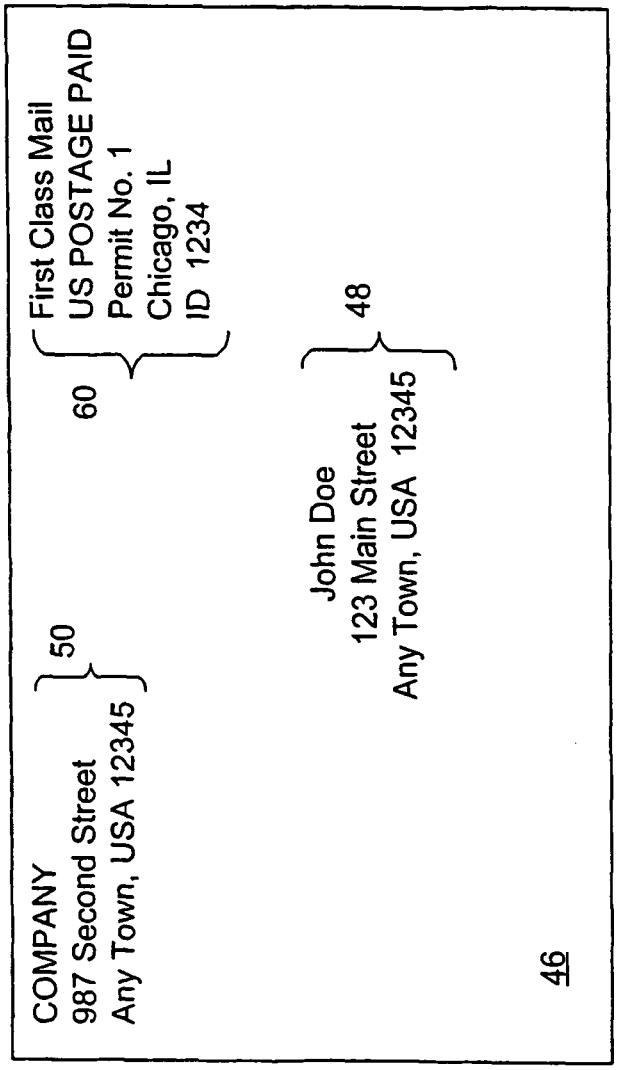
FIG. 2 shows one embodiment of an individual mailpiece of FIG. 1B.

FIG. 2 shows one embodiment of an individual mailpiece of FIG. 1B. In particular, an individual mailpiece 46 is labeled with a delivery address 48 and a return address 50. Mailpiece 46 may also be labeled to indicate a postage type 60. Postage type 60 may include a permit imprint, e.g., words printed on mailpiece 46.

In one embodiment, manifest mailing uses a permit imprint, which includes mail class, a postage paid indicator, permit number, a mailer city, and a unique mailpiece ID. Mail class may be first class mailpiece, a standard A mailpiece, a bulk mailpiece, a parcel, or even a priority mailpiece. However, any information which allows for efficient manifest mailing is within the principles of the present invention.

For example, as illustrated in FIG. 2, mailpiece 46 is addressed to John Doe, 123 Main Street, Any Town, USA 12345. On the upper left-hand corner of the mailpiece is return address 50. In this example, return address 50 is Company, 987 Second Street, Any Town, USA 12345. In the upper right-hand corner postage type 60 is a permit imprint which shows that the postage has been paid on this mailpiece, the class of mail is first class, Permit No. 1 was assigned to the mailer, Chicago, Ill. denotes the city in which the permit is held, and a unique mailpiece ID number, i.e., 1234 which will be printed on manifest 40.

FIG. 3 shows one embodiment of a manifest of FIG. 1B. In particular, manifest 40 includes a name and address section 62, a permit number section 64, a MAC version number section 66, a Post Office of Mailing section 68, a sequence number section 70, a date of manifest section 72, a class of mail section 74, and a processing category 76.

Manifest 40 also includes a body section 94 which includes an ID number column 78, a weight column 80, a ZIP/zone column 82, a class/rate column 84, a postage column 86, a page indicator 88, a page totals row 90, and a cumulative page totals row 92.

Name and address section 62 indicates the person or company that is using the manifest mailing. Permit number section 64 indicates the permit number that a company has been assigned by, from which postage funds are paid. MAC version number section 66 indicates if MAC certified software is being used and what version of MAC software is being used.

Post Office of Mailing section 68 indicates where the permit is held and where the mailing will be submitted. Sequence number section 70 is a value used to tie manifest 40 to a postage statement, which the Postal Service may use to withdraw funds from an advance deposit account.

Date of manifest section 72 indicates the date the manifest was submitted. Class of mail section 74 indicates which class postage is paid. Manifest 40 may indicate a mix of classes in class of mail section 74. For example, a class of mail of "mixed" may be used in class of mail section 74. This allows all one class such as first class mail, all priority mail, or all parcel post mail, or the option of combining various classes of mail in manifest 40.

Processing category 76 indicates what the size and shape of the mailpieces, for example, letter size, flat type, or machinable. In one embodiment, processing categories are not mixed in a mailing. However, processing categories can be mixed consistent with the principles of the present invention.

Body section 94 shows various aspects of mailpiece information. Column 78 indicates the mailpiece ID number. Weight column 80 indicates the weight of a mailpiece. In one embodiment, weight is listed in pounds. However, any measure of weight, e.g., ounces may be used consistent with the principles of the present invention.

ZIP/zone column 82 indicates information used to generally indicate shipping to and from locations. Class/rate column 84 indicates class and rate for a mailpiece. In one embodiment, class/rate column 84 uses a series of identifier codes, e.g., "1" for first class mail as noted in the MMS Guide. However, any combination of codes for indicating a mailpiece class or rate is within the principles of the present invention.

Postage column 86 indicates the postage charge for a mailpiece. Page total row 90 summarizes the information on that page. Cumulative page totals row 92 indicates cumulative page totals. Cumulative page totals row 92 shows a rolling summary of manifest 40. Thus, the last page of a multi-page manifest would have the totals for the entire manifest on the cumulative page totals row 92.

Figure 4A:
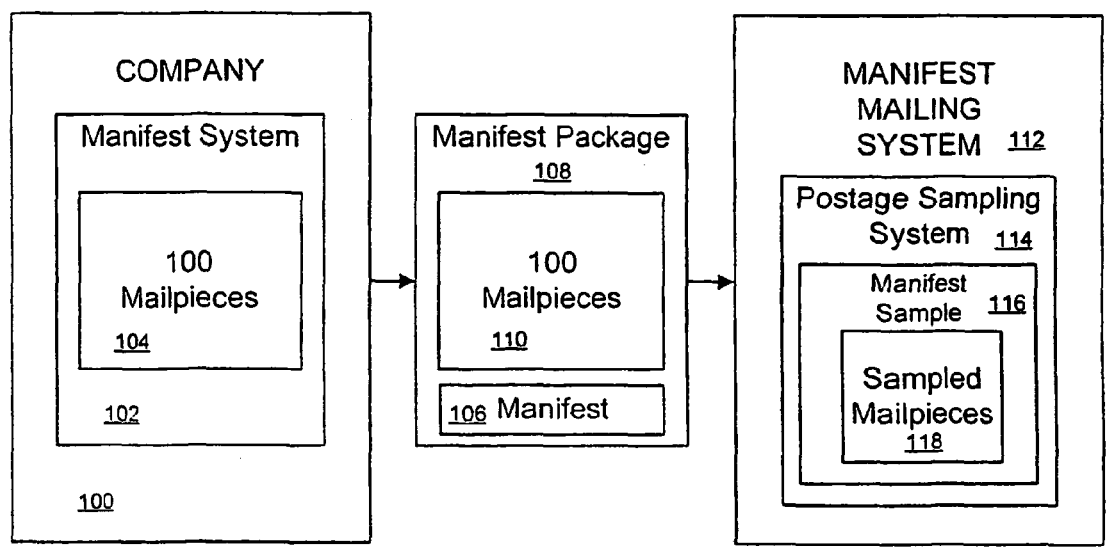
FIG. 4A shows one embodiment of how mail may be processed and sampled with a manifest mailing system of FIG. 1B.

FIG. 4A shows one embodiment of how mail may be processed and sampled with the manifest mailing system of FIG. 1B. In particular, a company 100 uses a manifest system 102 to mail 100 mailpieces 104. Company 100 then sends a manifest package 108, which includes a mailpiece package 110 and a manifest 106 to a manifest mailing system 112. Manifest mailing system 112 has a postage sampling system 114, which takes a manifest sample 116 of sampled mailpieces 118.

For example, for 100 mailpieces, a sample of 10 mailpieces may be used. The selected pieces would be weighed and checked against the values noted in manifest 106. Also, the postage paid against the rate claimed for that mailpiece may be checked against what is noted in manifest 106. This process is then repeated for each mailpiece in sampled mailpieces 118.

The accuracy of manifest 106 is then compared to the manifest sample 116 to ensure it is within a set value. If manifest 106 and manifest sample 116 are within given accuracy standards, then manifest 106 is considered accurate and accepted and manifest package 108 is dispatched. In one embodiment, the accuracy standard a value of 1½%. However, any desired value may be used consistent with the principles of the present invention.

If manifest 106 and manifest sample 116 are not within the given accuracy standards, then a formula for correcting the postage may be used and additional postage is collected in addition to the manifest postage. Alternatively, company 100 may take manifest package 108 back and correct manifest 106. However, any way of accounting for manifest errors is within the principles of the present invention.

In one embodiment, specific sampling requirements may vary according to Postal Service certification, e.g., such as those noted in the MMS Guide. However, any sampling requirement, which ensures manifest mailing system accuracy, is within the principles of the present invention.

Figure 4B:
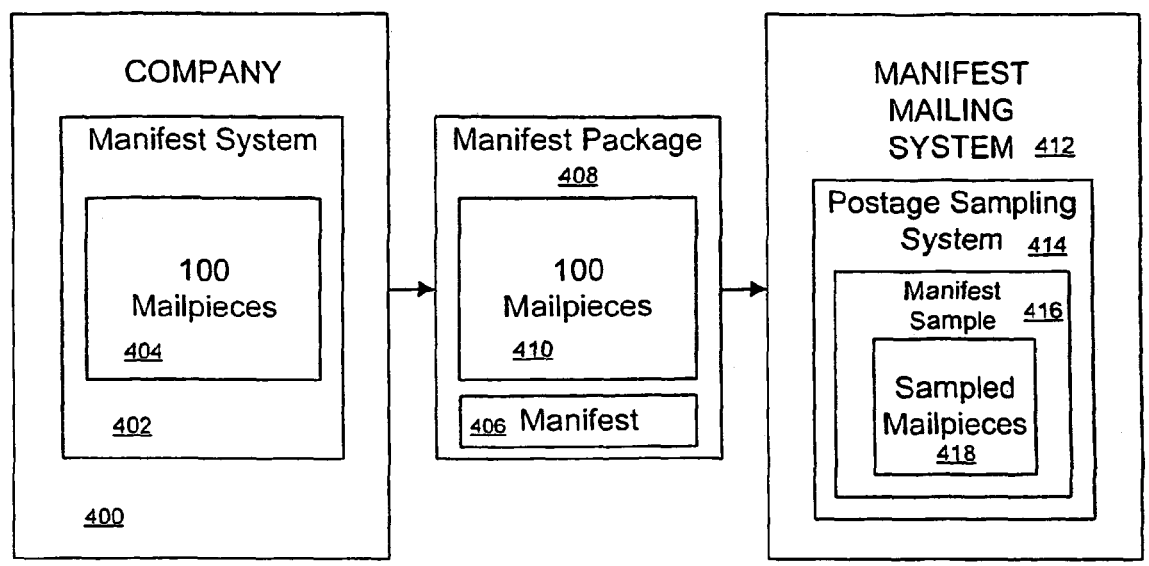
FIG. 4B shows one embodiment of how mail may be processed and sampled with a MAC certified mailing system.

FIG. 4B shows one embodiment of how mail may be processed and sampled with a MAC certified mailing system. In particular, a company 400 uses a MAC certified manifest system 402 to mail 100 mailpieces 404. Company 400 then sends a manifest package 408, which includes a mailpiece package 410 and a manifest 406 to a manifest mailing system 412. Manifest mailing system 412 has a postage sampling system 414, which takes a manifest sample 416 of sampled mailpieces 418.

For example, for 100 mailpieces, a sample of 10 mailpieces may be used. The selected pieces would be weighed and checked against the value noted in manifest 406. Also, the postage paid against the rate claimed for that mailpiece may be checked against what is noted in manifest 406. This process is then repeated for each mailpiece in sampled mailpieces 418. In one embodiment, postage sampling system 414 comprises Postal Service personnel, hardware and software to randomly select mailpieces at a specified rate (e.g., 10%). However, other combinations of personnel, hardware and software, which ensure an adequate sampling, are within the principles of the present invention.

The accuracy of manifest 406 is then compared to the manifest sample 416 to ensure it is within given accuracy standards. If manifest 406 and manifest sample 416 are within given accuracy standards, then manifest 406 are considered accurate and accepted and manifest package 408 is dispatched. In one embodiment, the accuracy standard is a value of 1½%. However, any value, which is considered acceptable, may be used consistent with the principles of the present invention.

If manifest 406 and manifest sample 416 are not within given accuracy standards, then a formula for correcting the postage may be used and additional postage is collected in addition to the manifest postage. Alternatively, company 400 may take manifest package 408 back and correct manifest 406. However, any way of accounting for manifest errors is within the principles of the present invention.

In one embodiment, the sampling requirement may be modified for MAC certified manifest mailing systems. For example, under MAC, the Postal Service may test vendor software to make sure that it is accurate and consistent. Upon receiving MAC, a vendor's software is assigned a version number and a variable manifest format may be used by the manifest mailing system. In another embodiment, the Postal Service may treat MAC certified manifest mailing systems like any other manifest mailing system. However, any sampling frequency, which ensures manifest mailing system accuracy, is consistent with the principles of the present invention.

Figure 4C:
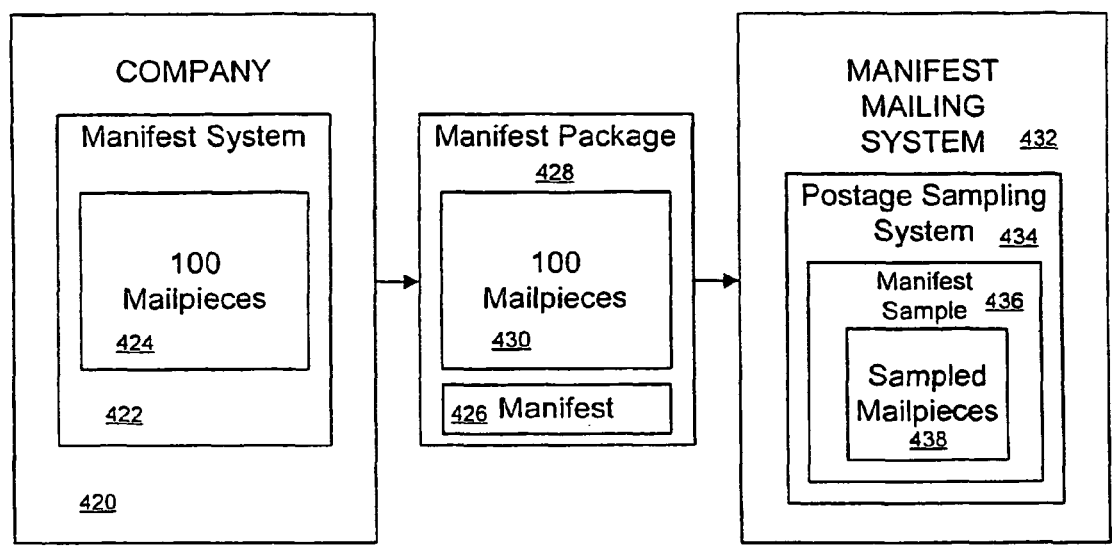
FIG. 4C shows one embodiment of how mail may be processed and sampled with a MAC Gold certified mailing system.

FIG. 4C shows one embodiment of how mail may be processed and sampled with a MAC Gold certified mailing system. In particular, a company 420 uses a MAC Gold certified manifest system 422 to mail 100 mailpieces 424. Company 420 then sends a manifest package 428, which includes a mailpiece package 430 and a manifest 426 to a manifest mailing system 432. Manifest mailing system 432 has a postage sampling system 434, which takes a manifest sample 436 of sampled mailpieces 438.

For example, for 100 mailpieces, a sample of 10 mailpieces may be used. The selected pieces would be weighed and checked against the value noted in manifest 426. Also, the postage paid against the rate claimed for that mailpiece may be checked against what is noted in manifest 426. This process is then repeated for each mailpiece in sampled mailpieces 438.

The accuracy of manifest 426 is then compared to the manifest sample 436 to ensure it is within given accuracy standards. If manifest 426 and manifest sample 436 are within given accuracy standards, then manifest 426 is considered accurate and accepted and manifest package 428 is dispatched. In one embodiment, the accuracy standard is a value of 1½%. However, any value, which is considered acceptable, may be used consistent with the principles of the present invention.

If manifest 426 and manifest sample 436 do not correspond to each other, then a formula for correcting the postage may be used and additional postage is collected in addition to the manifest postage. Alternatively, company 420 may take manifest package 428 back and correct any errors in manifest 426. However, any way of accounting for manifest errors is within the principles of the present invention.

In one embodiment, the sampling requirement may be modified for MAC certified manifest mailing systems. For example, under a MAC Gold system, the Postal Service may sample the mailpieces less frequently (e.g., monthly rather than weekly). Less sampling may be required under MAC Gold, since both hardware and software may be approved and the manifest format is usually set. However, any sampling frequency, which ensures manifest mailing system accuracy, is within the principles of the present invention.

Figure 5:
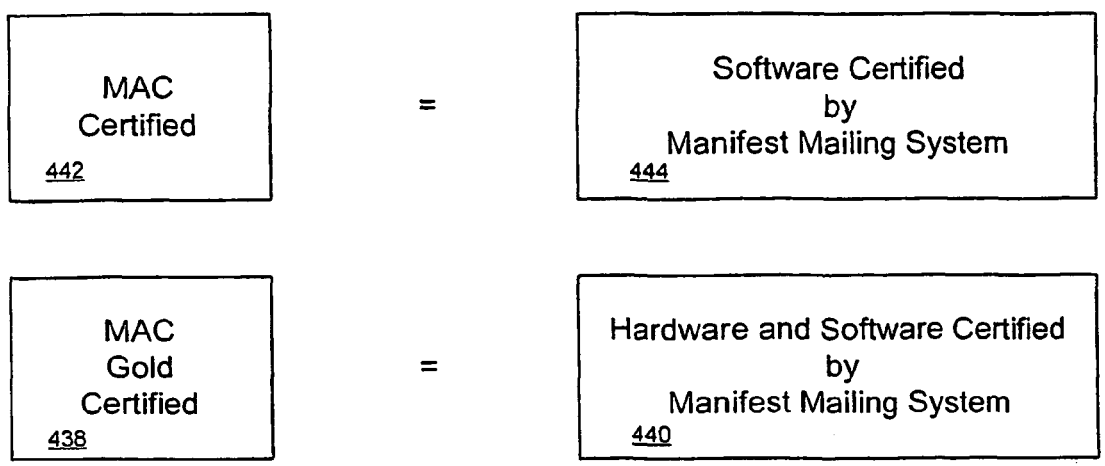
FIG. 5 shows one embodiment of the certifications encompassed by MAC and MAC Gold certification.

FIG. 5 shows one embodiment of the certifications encompassed by MAC and MAC Gold certification. In particular, for example, MAC certification 442 encompasses a software certification 444. MAC Gold certification 438 encompasses a hardware and software certification 440. However, any number of certifications for various combinations of hardware and software are within the principles of the present invention.

In one embodiment, the Postal Service conducts the certification and issues the certifications. However, any party, which is qualified to certify a manifest mailing system, may be used consistent with the principles of the present invention.

Figure 6A:
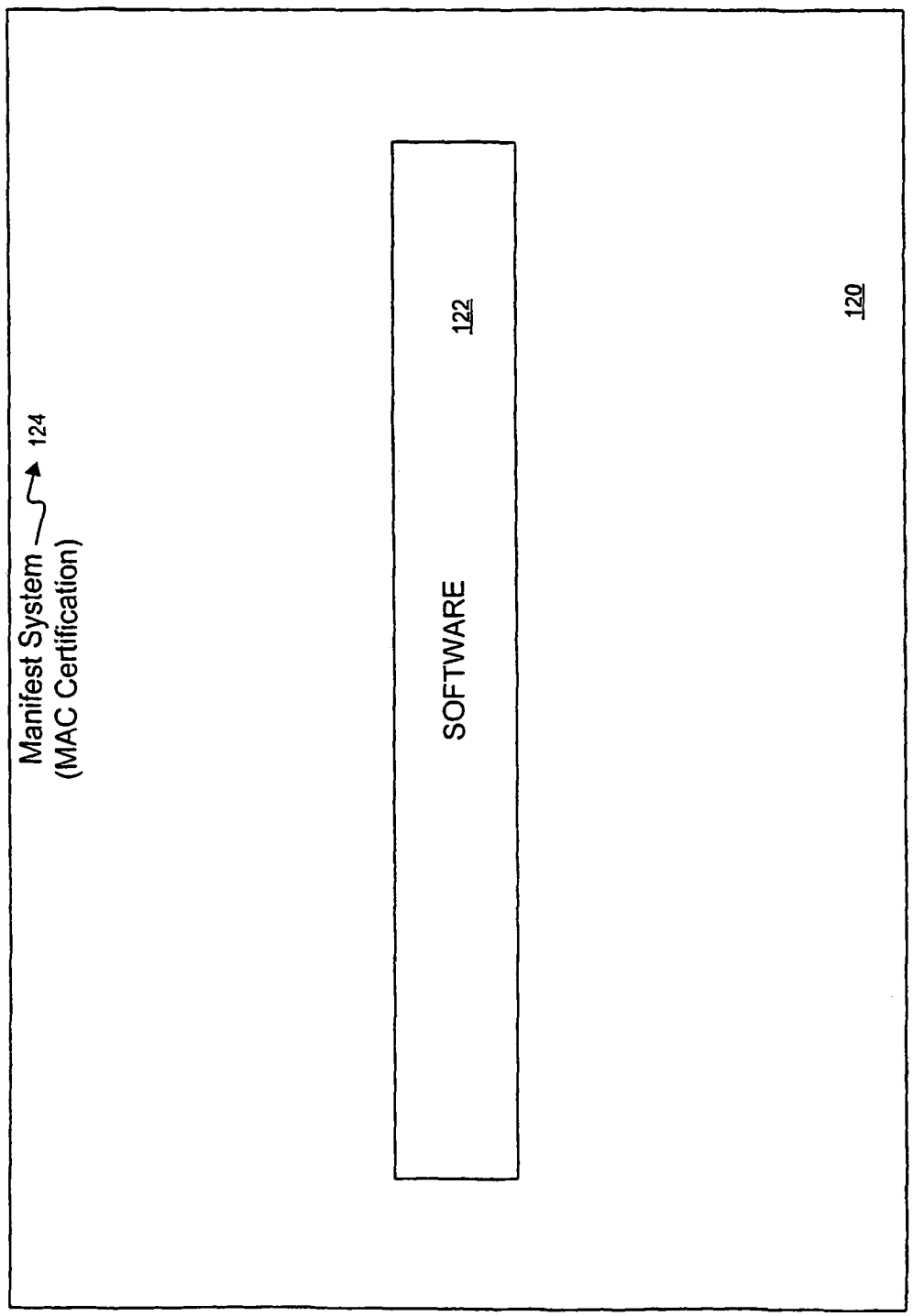
FIG. 6A shows one embodiment of a manifest mailing system with MAC certification.

FIG. 6A shows one embodiment of a manifest mailing system with MAC certification. In particular, manifest mailing system 120 has a MAC certification 124 of software 122. However, any combination of software and hardware components or other related aspects of manifest mailing may be certified consistent with the principles of the present invention.

Figure 6B:
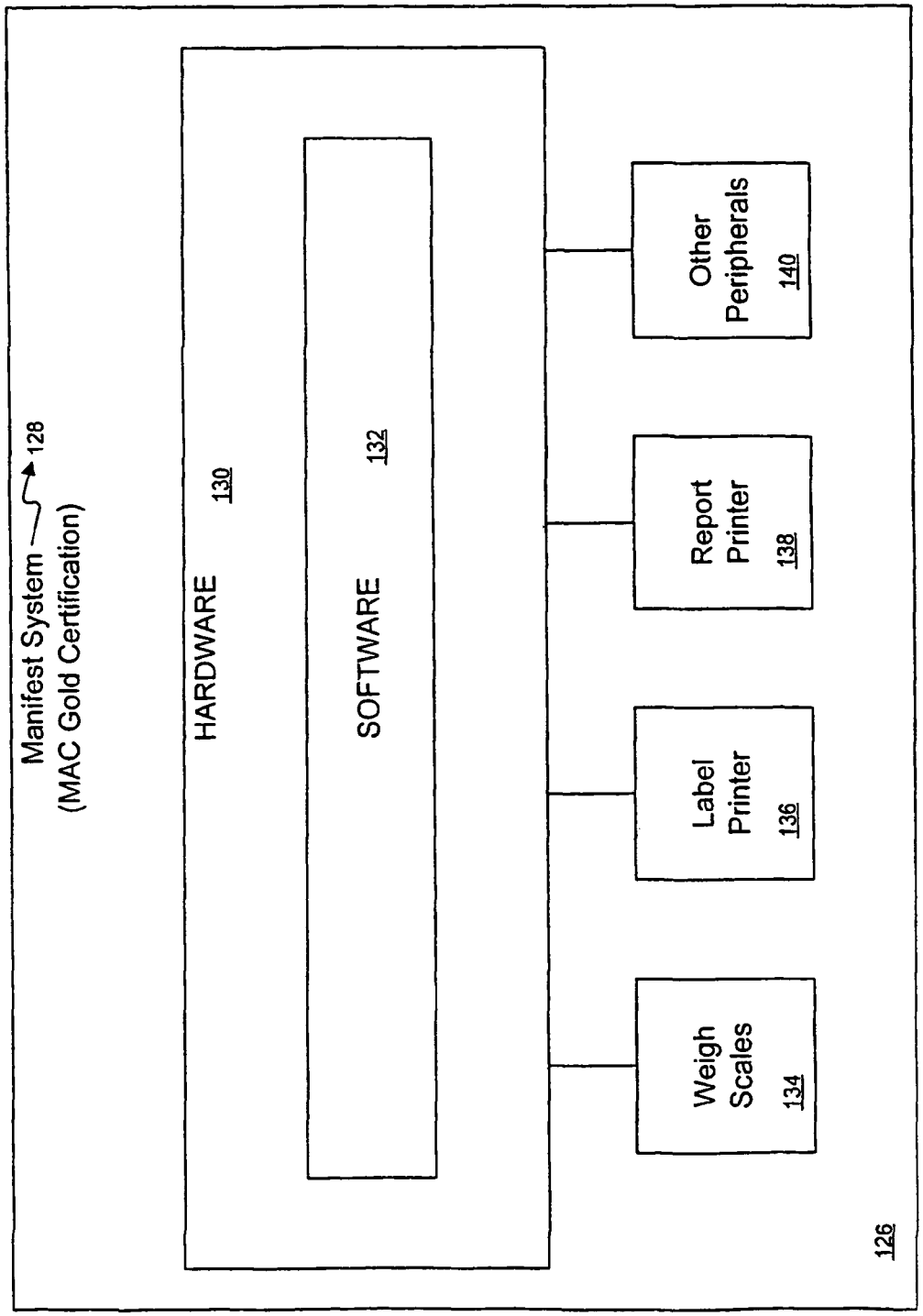
FIG. 6B shows one embodiment of a manifest mailing system with MAC Gold certification.

FIG. 6B shows one embodiment of a manifest mailing system with MAC Gold certification. In particular, manifest mailing system 126 has a MAC Gold Certification 128 of software 132 and hardware 130. Hardware 130 includes a weigh scale 134, a label printer 136, a report printer 138, and other peripherals 140, e.g., a scanner. However, any combination of software and hardware components or other related aspects of manifest mailing may be certified consistent with the principles of the present invention.

Figure 7:
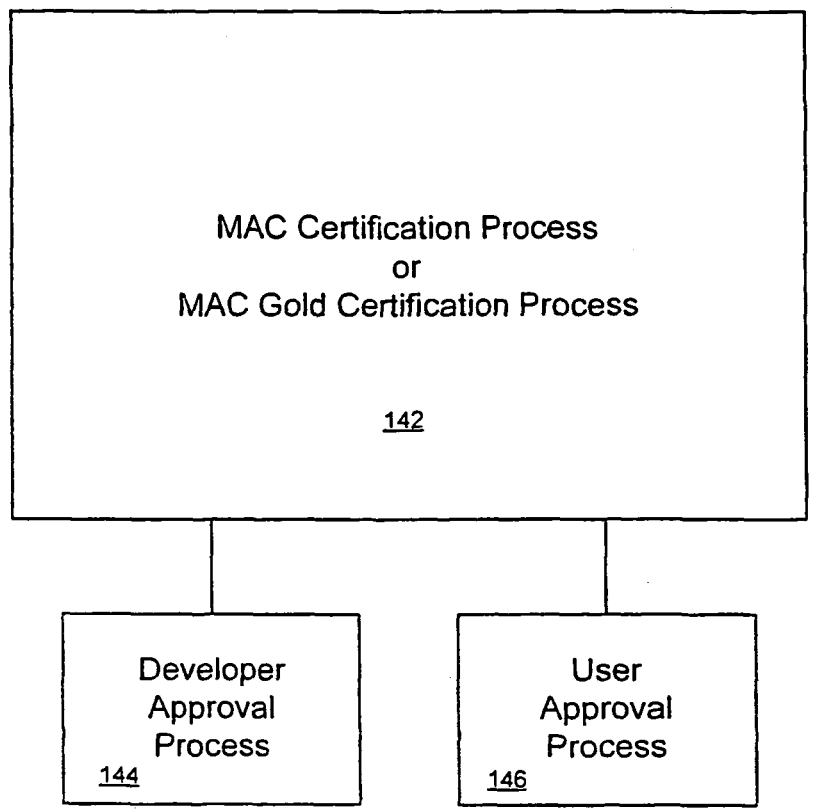
FIG. 7 shows an overview of one embodiment of a certification process.

FIG. 7 shows an overview of one embodiment of a certification process. In particular, certification process 142 is comprised of developer approval process 144 and user approval process 146.

For example, in developer approval process 144, a developer of manifest mailing systems may be required to obtain certification for a particular manifest mailing system, before the developer may offer the manifest mailing system as a certified system. In user approval process 146, a user of a particular manifest mailing system may be required to obtain certification, before the user may begin to use the manifest mailing system to send mail using a manifest.

In one embodiment, certification comprises a developer approval process and a user approval process. However, any approval process, which ensures certification integrity, may be used consistent with the principles of the present invention.

Figure 8A:
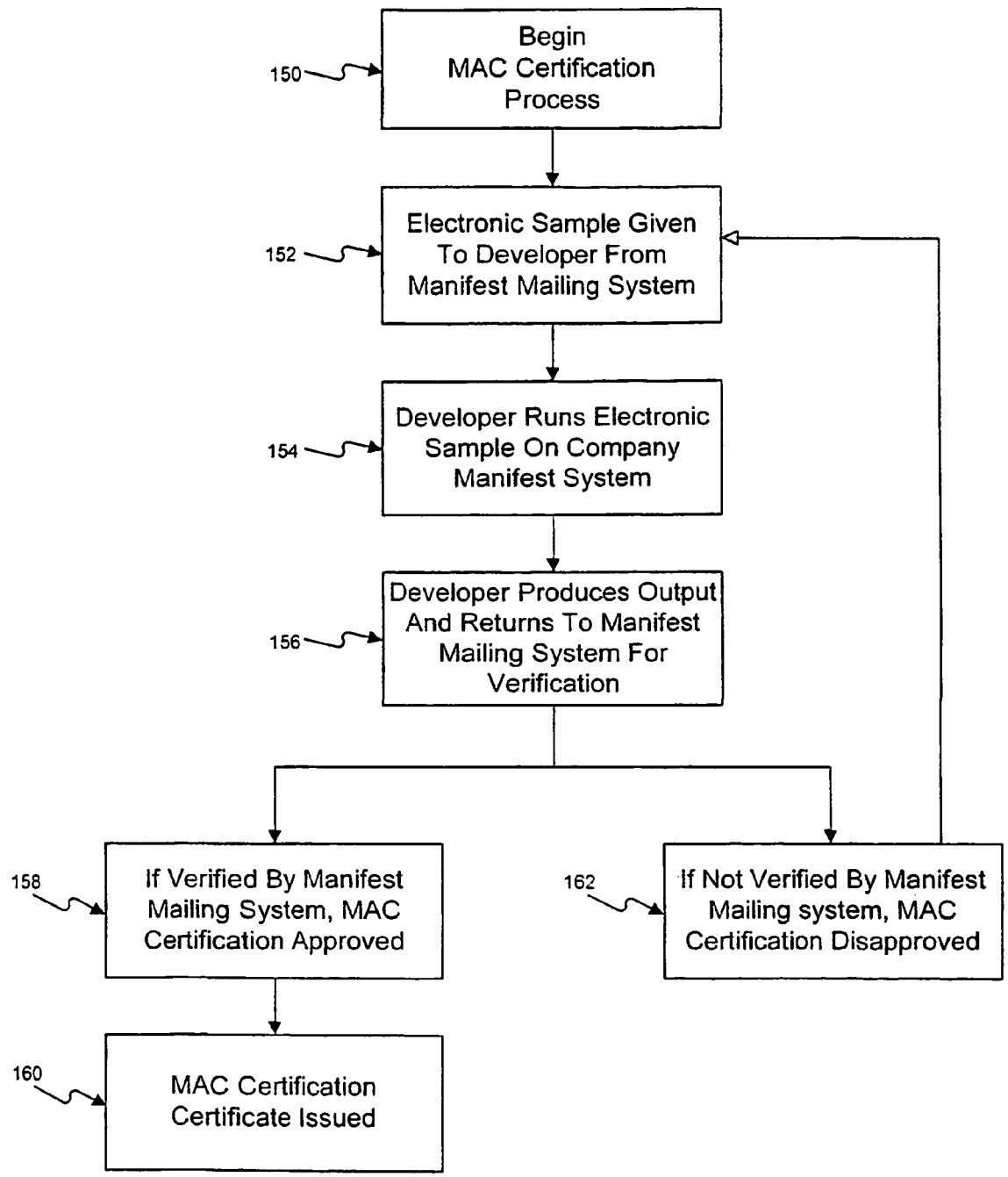
FIG. 8A shows one embodiment of a developer approval process for MAC certification.

FIG. 8A shows one embodiment of a developer approval process for MAC certification. In particular, in stage 150, a developer begins the developer approval process by submitting a request. In stage 152, an electronic sample or test is given to the developer of the manifest mailing system. In stage 154, the developer takes the electronic sample or test and runs it on the manifest mailing system. In stage 156, the developer then produces an output, including the manifest postage statements and shipping labels, if any, and submits this information for verification.

In stage 158, the information is graded and if approved, then certification is approved. In stage 160, the developer is given MAC certification, and a MAC certificate is issued. If the information is not approved, then in stage 162 the certification is disapproved. As a result, the developer must return to stage 152 and submit another sample output for verification.

Figure 8B:
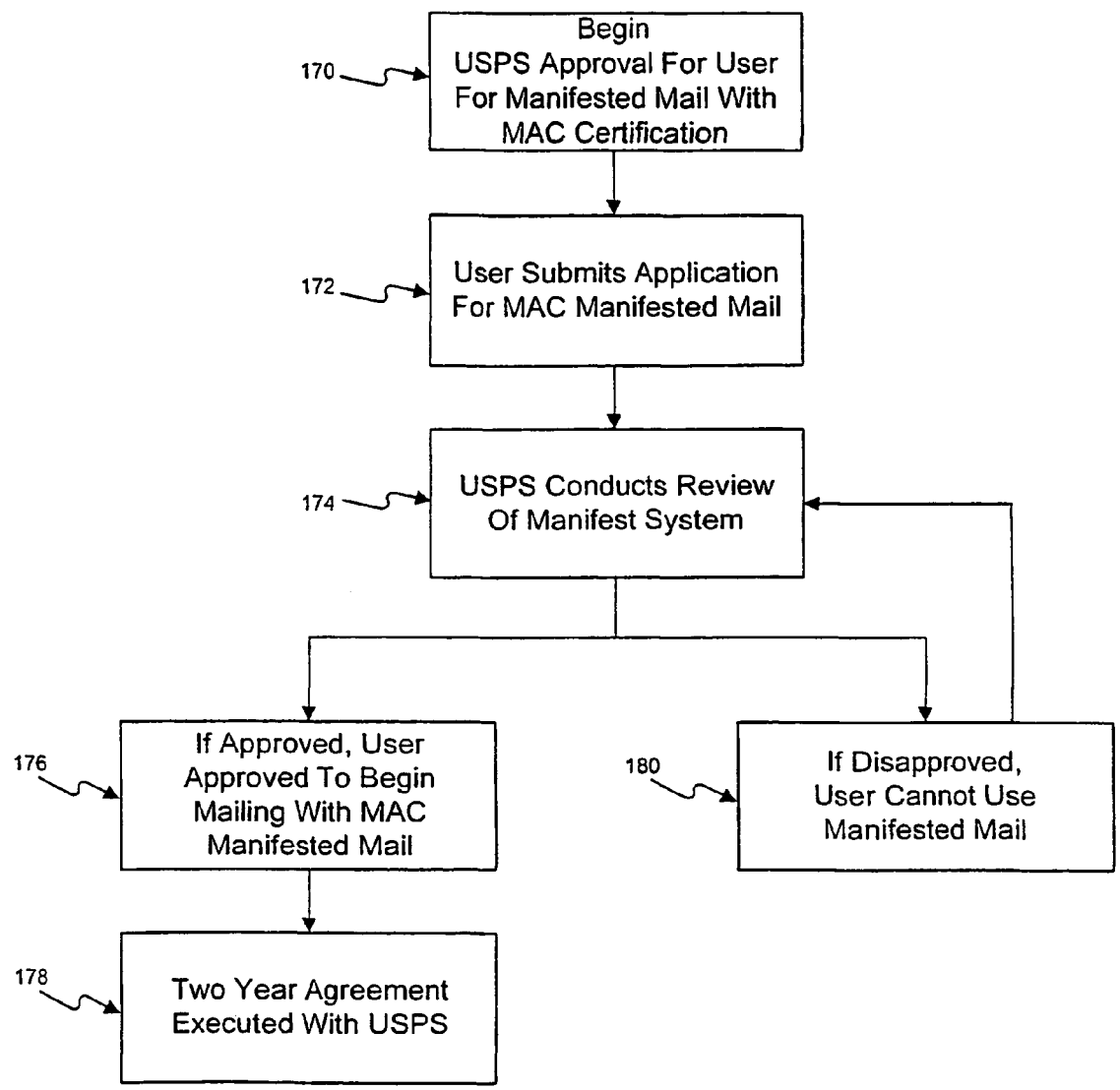
FIG. 8B shows one embodiment of a user approval process for MAC certification.

FIG. 8B shows one embodiment of a user approval process for MAC certification. In particular, in stage 170, the user begins the user approval process, e.g., by requesting an application. In stage 172, the user submits an application, explaining what the user intends to mail using the manifest mailing system.

Upon receipt of the application, in stage 174, the mailing service conducts a review of a user's manifest mailing system. For example, the Postal Service may visit the user site and inspect the system. Depending on the type of manifest mailing system, more than one review may be conducted. In one embodiment, during a review, the Postal Service checks the type of mail used by the manifest mailing system, evaluates the quality control exercised by the user, confirms the output from the manifest mailing system, and documents the results of the review. However, any review stages, which ensure manifest mailing system quality, are within the principles of the present invention.

In stage 180, if there are any errors found, the manifest mailing system is not approved, and user must repeat stage 174 and another review is conducted. In stage 176, if the user is approved, then the manifest mailing system is certified. In stage 178, the user enters a manifest mailing agreement and the user can begin mailing with the MAC certified manifest mailing system. In one embodiment, the manifest mailing agreement is for 2 years. However, any agreement term may be used consistent with the principles of the present invention.

Figure 9A:
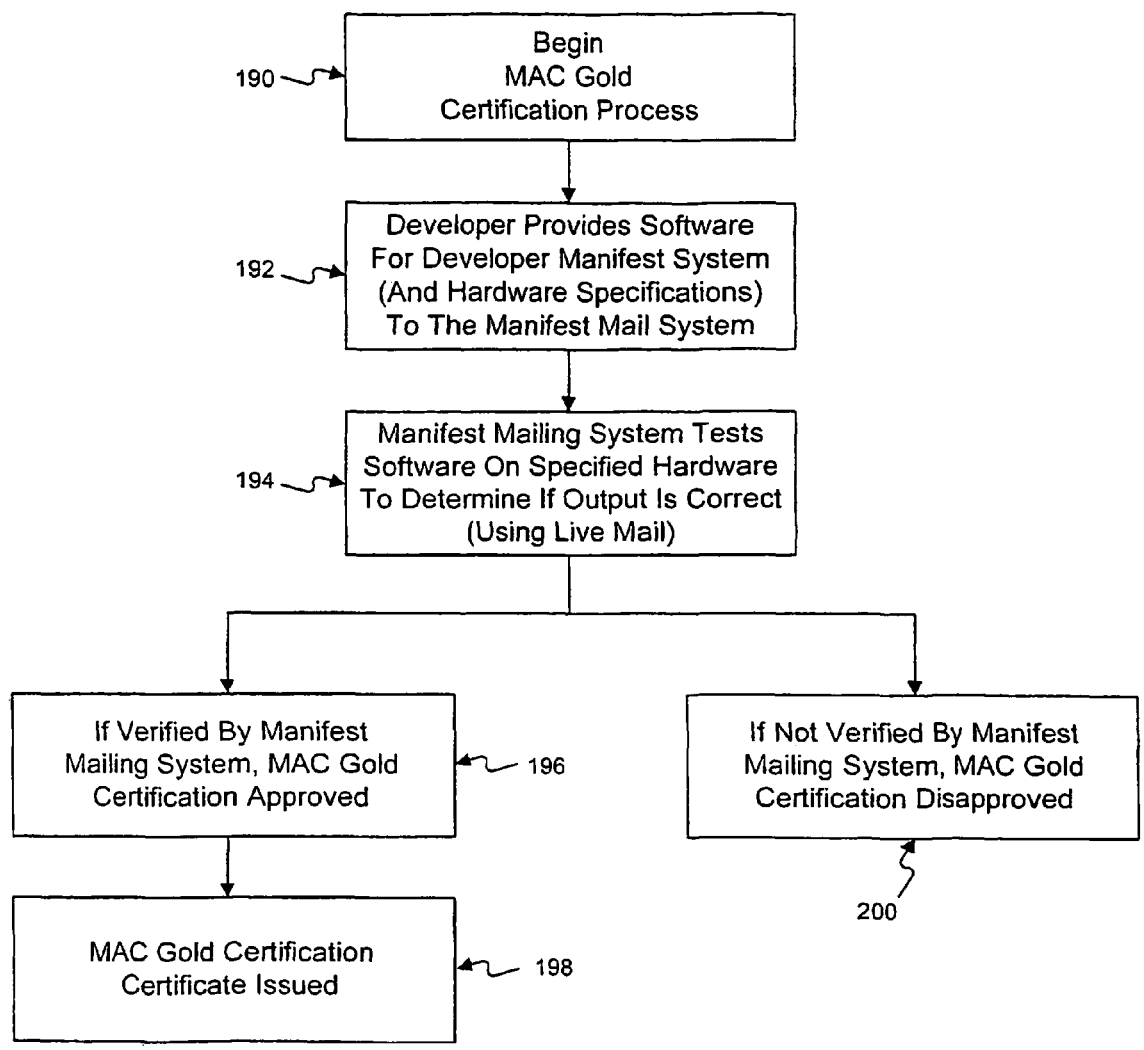
FIG. 9A shows one embodiment of a developer approval process for MAC Gold certification.

FIG. 9A shows one embodiment of a developer approval process for MAC Gold certification. In particular, in stage 190, the developer begins the certification process, e.g., by requesting an application. In stage 192, the developer provides both hardware specifications and the software for certification. In one embodiment, the developer submits hardware specifications and software to the Postal Service for certification. However, any trusted or approved entity may act as a certification body.

In stage 194, the manifest mailing system is put through various tests to ensure that the system performs according to the certification standards. In one embodiment, testing uses live mailpieces includes putting mailpieces on a scale, and running mailpieces through various rate categories. However, any testing methodology may be used consistent with the principles of the present invention.

In stage 196, if the manifest mailing system passes all the tests at a specified accuracy rate, then the system is approved as MAC gold certified. In one embodiment, an accuracy rate of 100% is used for attaining MAC gold certification. However, any high accuracy percentage may be used consistent with the principles of the present invention.

In stage 198, a MAC Gold certificate is then issued for that particular system version, and that particular version number. In one embodiment, if a MAC Gold certificate is issued, the hardware, including the printer, the scales, and all other hardware, is certified. However, certification of hardware may cover any combination of components, consistent with the principles of the present invention.

In stage 200, if the system does not pass all the tests at the specified accuracy rate, the system is not approved, and the developer will have to correct the problems and submit another test.

Figure 9B:
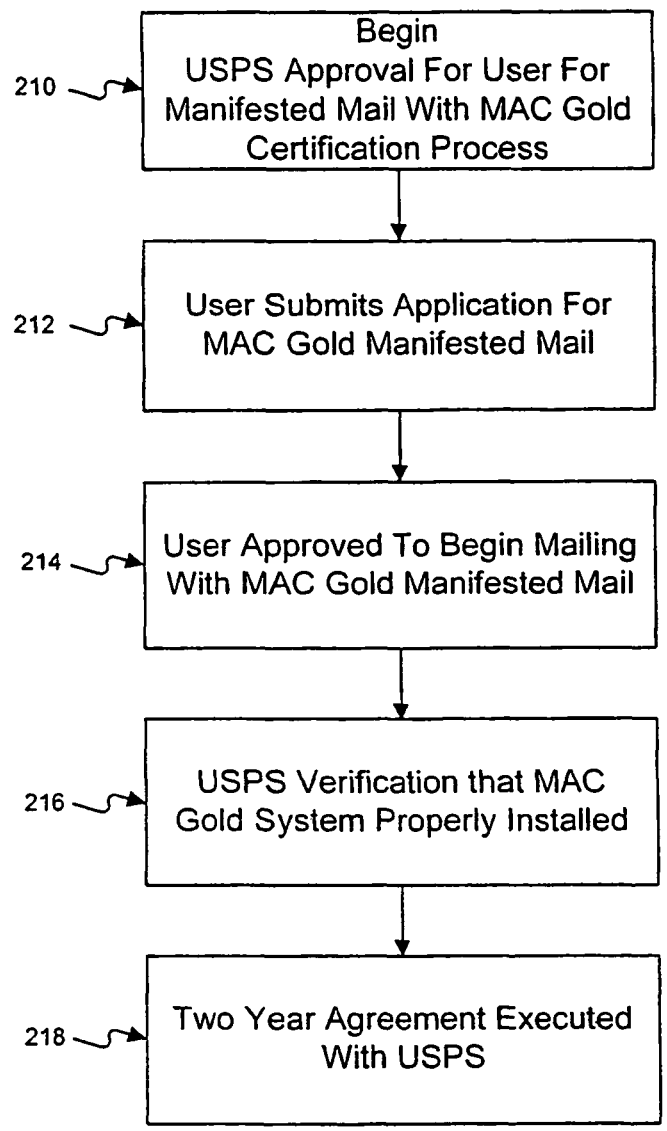
FIG. 9B shows one embodiment of a user approval process for MAC Gold certification.

FIG. 9B shows one embodiment of a user approval process for MAC Gold certification. For example, the Postal Service MAC Gold MMS application process is described in *MAC Gold Manifest Mailing System Application Process*, published by U.S. Postal Service and which is incorporated herein by reference. In stage 210, the user begins the MAC Gold certification process, e.g., by requesting an application. In one embodiment, the user begins the MAC Gold certification process by obtaining a pre-approved system and requesting an application from the Postal Service. However, any notice by a user of intent to use a pre-approved system is within the principles of the present invention.

In stage 212, a user submits an application to use a MAC Gold certified manifest mailing system. In one embodiment, the user submits the application at the time of purchase. For example, the application may only be a single page requesting the name and contact information for the applicant, what type of MAC Gold system the applicant will be using, what days the applicant plans to mail, and when the applicant wants to begin mailing. The user then submits the application to the Postal Service.

In stage 214, the user is approved to begin mailing. In one embodiment, once the application has been submitted, the user can begin mailing using the manifest mailing system with MAC Gold certification immediately.

In stage 216, the Postal Service may visit the user to verify that the manifest mailing system in use is the same system stated in the application and properly installed. In stage 218, if the MAC Gold manifest mailing system is verified, the user can continue to mail and a manifest mailing system agreement is executed. In one embodiment, the manifest mailing agreement is a 2-year agreement with the Postal Service. However, any acceptable terms to the Postal Service are within the principles of the present invention.

FIG. 10A shows one embodiment of a form used by a developer for MAC Gold certification. In particular, form 220 comprises a basic information section 222, a supported categories section 224, an options supported section 226, and a billing section 228.

Basic information section 222 indicates who the developer is, e.g., address, contact persons, phone numbers, the product name to be tested and the version number of that product. Supported categories section 224 lists categories that must be supported by the product. Options supported section 226 lists the optional set of supported features by the product. For example, some of these supported features include the priority mail flat rate, a job set up/parameter/report, standard mail B barcode discount, the balloon rate, and the oversize rate.

Billing section 228 notes various fees and information required for billing. For example, there may be a $500.00 fee to have a product tested. Other information appropriate for a certification form will be apparent to those skilled in the art consistent with the principles of the present invention.

FIG. 10B shows additional information of the sample form shown in FIG. 10A. In particular, on form 230 in section 232, the developer lists the hardware specifications that the system will need to run the manifest product. These hardware specifications may include CPU size, the hard drive capacity, the memory, and any other hardware specifications.

In section 234, the form asks the developer to circle the operating systems that the manifest system is designed for, and to list any operating systems that are not listed. For example, the developer can select operating systems from DOS to Windows to Unix.

In section 236, the form asks for a list of all barcode formats the manifest system supports. In section 238, additional information is requested to aid follow up with the developer after testing has occurred. In section 240, the form asks the developer to list all weight scales that the manifest system supports, including the manufacturer and model number of the scales that the system supports. In section 242, the form asks for all thermal printers the manifest system supports, including a list of the manufacturers and model numbers.

FIG. 11A shows a sample standardized MAC Gold manifest. In particular, section 252 indicates the mailer's name and address. Section 254 provides information needed by the Postal Service, such as, the date of the manifest, the Post Office of mailing, the permit number, the processing category, which is permanently listed as mixed because the system allows mixed manifests and the MAC Gold product name and version number. Thus, section 254 indicates that the manifest was produced using a MAC Gold system.

Section 256 indicates the manifest sequence number that correlates the manifest to any other documentation, such as a postage statement. Section 258 is the page number. Column 260 indicates the unique mailpiece ID listed on the mailpiece.

Column 262 indicates any delivery confirmation numbers. Delivery confirmation numbers aid in showing that a mailpiece was actually delivered, and a specific number is used, e.g., a number associated with a barcode. With a delivery confirmation number, when the mailpiece is delivered to a customer, the carrier can tell that the mailpiece has been delivered. In one embodiment, a delivery confirmation number must be listed on the manifest, if delivery confirmation is being used. However, any delivery confirmation number for a particular mailpiece may be used consistent with the principles of the present invention.

Column 264 is the five-digit ZIP code. In one embodiment, when delivery confirmation numbers are used, a five-digit ZIP code is required. However, other times when a ZIP code may be required are within the principles of the present invention.

Column 266 is the weight of the individual mailpiece. Column 268 is the class and rate of the mailpiece. For example, code "1P" stands for priority mail. Column 270 is the fee. For example, a fee may be associated with some types of special delivery, such as delivery confirmation. In one embodiment, if there is a fee, it is collected in addition to the normal postage.

Column 272 is the postage for the mailpiece. Column 274 indicates the cumulative postage, which aids the calculation of postage on the manifest. For example, in the MAC Gold system, a cumulative postage column may be used instead of postage totals at the bottom of each page.

Item 276 shows an asterisk by a mailpiece. Asterisk 276 denotes that the mailpiece is a barcoded piece. For example, instead of having a separate column for a barcode, asterisk 276 denotes that mailpiece has a barcode and that the mailpiece is eligible for a discount, e.g., a 3 cent per mailpiece discount under the current rate structure.

Figure 11B:
FIG. 11B is a continuation of the sample manifest of FIG. 11A.

FIG. 11B is a continuation of the sample manifest of FIG. 11A. Item 280 shows the various totals at the end of the manifest. For example, under unique mailpiece ID number column 260, the "total" is the total number of mailpieces on the manifest. Under delivery confirmation column 262, the "total" is the total number of delivery confirmation mailpieces in the mailing. Under 5-digit ZIP code column 264, there is nothing under "total." Under weight column 266, the "total" is the total weight of the entire manifest in pounds. However, any units of weight are consistent with the principles of the present invention.

Under class/rate column 268, there is nothing under total. Under fee column 270, the "total" is total amount of fees paid under the manifest. Under postage column 272, the "total" is the total amount of postage paid under the manifest. Under cumulative postage column 274, the "total" is the cumulative total of postage paid under the manifest.

Additionally, form 282 and form 284 may be appended to the end of the manifest, as shown in FIG. 11B. Form 282 may be used for identification purposes when using delivery confirmation. Delivery confirmation is a special service, also known as accountable mailpiece processing. Form 282 is used for delivery confirmation with a manifest mailing system. For example, form 282 may be called PS Form 3877, also known as the "firm mailing book." Form 282 allows an accepting employee to confirm that they have indeed received a certain number of accountable mailpieces (i.e., mailpieces with delivery confirmation). In one embodiment, to use form 282, the employee writes down the number of mailpieces received, signs the forms, and stamps the forms.

Form 284 known as PS Form 3152, or the Delivery Confirmation Certificate, may also be incorporated. Form 284 establishes that there is an electronic file that exists for the delivery confirmation.

Figure 12:
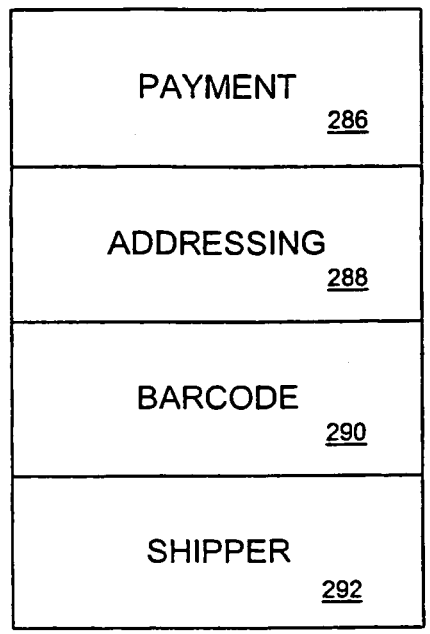
FIG. 12 shows a simplified graphic of one embodiment of a label format.

FIG. 12 shows a simplified graphic of one embodiment of a label format. In particular, the payment portion 286 shows the payment information, which may include the permit imprint indicia that indicates method of payment. Addressing portion 288 shows the addressing information. Barcode portion 290 shows barcode information. For example, barcode portion 290 may be used to show a barcode for delivery confirmation. Shipper portion 292 is an area for the shipper to use in any fashion they desire (e.g., for an advertisement). Other portions and formats for a label format will be apparent to those skilled in the art consistent with the principles of the present invention.

Figure 13:
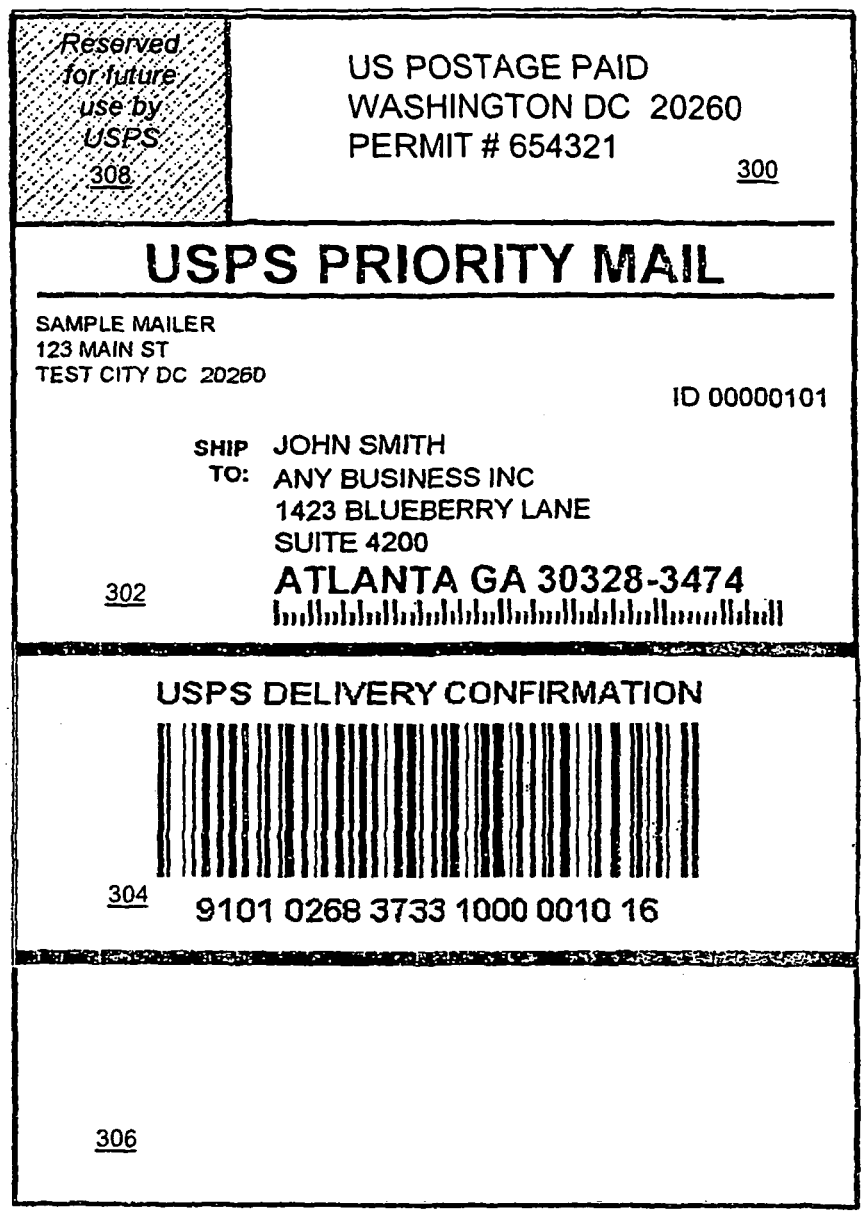
FIG. 13 shows an example of the label format of FIG. 12.

FIG. 13 shows a specific example of the label format of FIG. 12. In particular, portion 300 shows "U.S. Postage Paid, Washington, D.C. 20260" and the permit number which indicates the payment information. Portion 302 for addressing information is shown indicating "USPS Priority Mail." In addition, the rate and class of mail, the name, the business, the city, state and the ZIP code are shown in portion 302. In addition, in the upper left-hand corner of portion 302, the return address is listed and in the upper right-hand corner, the package ID is designated. For example, the package ID may be a unique identification number for each mailpiece.

Portion 304 is the barcode area. For example, if the shipper is using delivery confirmation, the shipper includes the delivery confirmation barcode in portion 304. Also, the words "U.S.P.S. delivery confirmation" may appear. Additionally, human readable characters of that barcode may appear under the barcode in portion 304.

If the mailer is not using delivery confirmation, this area may be left blank. Alternatively, portion 304 may contain a parcel routing barcode, which is a smaller barcode. In portion 306, a shipper may place any additional information.

Figure 14:
FIG. 14 shows a sample MAC Gold certification certificate.

FIG. 14 shows a sample MAC Gold certification certificate. Once a developer has submitted both the software and hardware specifications for testing, and once approved, a MAC Gold certification certificate 308 is issued to the developer. In one embodiment, the certificate 308 lists the product and the version number that have been approved. However, any appropriate information for noting certification is within the principles of the present invention.

FIG. 15 shows a sample MAC Gold certified products listing. In one embodiment, a collection of product listings of all vendors whose products have been MAC Gold certified is maintained. Item 312 represents that the product listing is the first cycle, i.e., "Cycle A." The listing 310 will include a company information section 314, a mail class section 316, an options supported section 318, an equipment supported section 320, and other information section 322.

For example, company information section 314 may include the company name, what the software was developed for, the product name, the product version, the sales contact, and the address and city and the phone numbers and e-mail and web addresses for the sales contact.

Mail class section 316 may include the domestic mail classes that are approved. Mail class section 316 may also show a special service, e.g., the one special service available with MAC Gold, delivery confirmation.

Options supported section 318 may include any options that may be supported by MAC Gold, such as, the MAC Gold manifest report, the parameter report, the shipping label, the standard mail B parcel post discount, over sized rates, balloon rates, and the various barcode formats.

Equipment supported section 320 may include the supported equipment. For example, this section may provide the platforms on which the product would run, the types of scales which could be used, the thermal printers, the ink jet printers, the laser printers, and any barcode scanners. Other information section 322 may indicate the price range and the date of certification. Other information and sections appropriate for a product listing will be apparent to those skilled in the art consistent with the principles of the present invention.

FIG. 16 shows one embodiment of a form used by a user in order to use a MAC Gold system. When a user has purchased a MAC Gold system and intends to use a MAC Gold system, a user would fill out the form shown in FIG. 16. In one embodiment, the application is a one-page application.

In particular, in section 324, a mailer's (or user's) name and contact information are requested. In section 326, the name and contact information for a user's responsible representative are requested.

In section 328, if the user is going to use delivery confirmation, then the user must provide a DUNS number. DUNS refers to a business organization to which a user (or mailer) may apply for a registration number. DUNS assigns a number to the user to identify the user to the Postal Service. In section 328, the user may also provide other identification information on the application form, such as a telephone number and a fax number.

In section 330, the user indicates any options. For example, some options available with MAC Gold are priority mail, parcel post, and delivery confirmation. The user can select any or all of those options by identifying these options on the application form. The user also responds to six questions on the application form. Question number 1 asks what MAC Gold products the user is planning to use by the version number, what scales will be used by manufacturer and model number, and the supplier and installer of the MAC Gold product, including name, address and other contact information.

Question 2 asks if the user will install the MAC Gold product at multiple mailing sites. If so, the user must submit an application for each site where the MAC Gold product will be used. Question number 3 asks where the user will pay postage, i.e., which Post Office. Question 3 also asks for the city, state, ZIP and permanent imprint account number. Question 3 reminds the user that a permit imprint account is needed, before the user can begin processing mailings with the MAC Gold product. Question number 4 asks if the user intends to use delivery confirmation, and if so, to select the method that will be used to transmit the electronic files for delivery confirmation. Delivery confirmation includes the transfer of electronic files with the Postal Service. For example, the question allows the user to indicate if the user plans to use Internet FTP or FTP using a dial-up modem. The question also allows the user to indicate zipped or un-zipped files. Question number 5 asks what day(s) of the week the user will submit manifests using the MAC Gold product. The Postal Service, for example, does not accept manifests on Sundays. Question number 6 asks what date the mailer wants to begin using the MAC Gold product. Once the application form is complete, the user submits the application, e.g., to the MAC Gold department for the Postal Service in Memphis, Tenn. Other questions and information appropriate for an application will be apparent to those skilled in the art consistent with the principles of the present invention.

FIGS. 17A-17D show one embodiment of a standard MAC Gold manifest mailing system agreement. This agreement may be required between the user and the Postal Service, so that the user can pay postage to the Postal Service. In one embodiment, a standard MAC Gold manifest mailing system agreement is used for all users who decide to mail using the MAC Gold system.

FIG. 17A shows a first page of one embodiment of a standard MAC Gold manifest mailing system agreement. In particular, a name, address and a desired Postal Office are specified. In addition, standard agreement language is shown.

FIG. 17D shows where the user completes the name and other contact information and signs the completed agreement. Other information and language will be apparent to those skilled in the art consistent with the principles of the present invention.

In one embodiment, the completed and signed agreement is then mailed, e.g., to the MAC Gold department for the Postal Service in Memphis, Tenn. The application will be forwarded to the local Post Office for the user, so that the local Post Office knows that the user may begin mailing using the MAC Gold system.

FIGS. 18A and 18B show one embodiment of a MAC Gold confirmation review checklist. In one embodiment, the review checklist shown in FIGS. 18A-18B is taken to the mailer site to confirm a manifest mailing system. During the first week of mailings created by the MAC Gold product, one mailing is inspected to ensure that the certified mailing system is working properly.

In particular, FIG. 18A shows five questions. Question number 1 asks whether the MAC Gold product name and version as shown in the header of the manifest match the approved product as listed on the MAC Gold certificate. Question number 2 asks whether the scale model connected to the mailer system matches the approved product as listed on MAC Gold Product Listing. Question number 3 asks whether the manifest is formatted the same as the sample manifest received with the application. Question number 4 asks whether the postage statements are formatted the same as the sample postage statements received with the application. Question number 5 asks whether the shipping labels on the pieces are formatted the same as the sample shipping labels received with the application.

If the answers to these five questions are yes, then the agreement, e.g., as shown in FIGS. 17A-17D, is approved and signed by the Postal Service. The user is then approved to begin mailing. In one embodiment, the USPS Manifest Agreement uses a period of 2 years. Thereafter, the agreement may be reviewed. However, other conditions and procedures for executing an agreement are within the principles of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for processing mailpieces from a mail system, the method comprising:
   testing the accuracy of a manifest system used to create mailing manifests;
   based on the testing, assigning the manifest system either a first certification level or a second certification level;
   receiving a manifest created by the manifest system, wherein the manifest includes mailing information for each of a plurality of mailpieces;
   receiving the plurality of mailpieces listed on the manifest;
   if the manifest system has been assigned the first certification level, sampling the received mailpieces listed on the manifest at a first predetermined frequency;
   if the manifest system has been assigned the second certification level, sampling the received mailpieces listed on the manifest at a second predetermined frequency, the second predetermined frequency being more frequent than the first predetermined frequency;
   selectively determining an accuracy of the manifest based on the sampled mailpieces;
   delivering the plurality of mailpieces using the manifest if the accuracy of the manifest is greater than a predetermined value; and
   if the accuracy of the manifest is not greater than the predetermined value, then applying a formula for collecting additional postage for the mailpieces before delivery the mailpieces.

2. The method of claim 1, wherein the mailing information comprises a weight for each of the plurality of mailpieces.

3. The method of claim 2, wherein the mailing information comprises postage fee information for each of the plurality of mailpieces.

4. The method of claim 3, wherein selectively determining an accuracy of the manifest based on the sampled mailpieces comprises comparing the measured weights with the weights in the mailing information.

5. The method of claim 3, wherein selectively determining the accuracy of the manifest based on the sampled mailpieces comprises determining a postage fee, based on the measured weight, for each mailpiece in the sample.

6. The method of claim 5, wherein selectively determining the accuracy of the manifest based on the sampled mailpieces comprises comparing the determined postage fee with the postage fee information in the mailing information.

7. The method of claim 6, wherein conditionally delivering the plurality of mailpieces using the manifest, based on the accuracy of the manifest comprises:
   calculating an accuracy of the manifest as a function of the determined postage fee and the postage fee information; and
   delivering the plurality of mailpieces using the manifest when the accuracy of the manifest exceeds the accuracy standard.

* * * * *

UNITED STATES PATENT AND TRADEMARK OFFICE
CERTIFICATE OF CORRECTION

PATENT NO. : 8,423,375 B2  
APPLICATION NO. : 11/358139  
DATED : April 16, 2013  
INVENTOR(S) : Thomas M. Amonette, John J. Sadler and John F. Gullo Page 1 of 1

It is certified that error appears in the above-identified patent and that said Letters Patent is hereby corrected as shown below:

Title Page, Item (75) Inventors, Line 2, "Deinkirk, MD" should read as --Dunkirk, MD--.

Title Page, Item (57) Abstract, Line 14, "determine" should read as --determined--.

Signed and Sealed this
Second Day of July, 2013

Teresa Stanek Rea
*Acting Director of the United States Patent and Trademark Office*